(12) United States Patent
Nakanishi et al.

(10) Patent No.: US 6,341,200 B1
(45) Date of Patent: Jan. 22, 2002

(54) LENS-FITTED FILM UNIT

(75) Inventors: Kazuhiro Nakanishi; Kunikazu Takano; Hiroshi Kibayashi; Hiromi Nakanishi; Tetsufumi Takaba, all of Hino; Wataru Hiroshima, Hamura; Tsuyoshi Takeda, Hamura; Akira Aoki, Hamura; Kanichi Onda, Hamura, all of (JP)

(73) Assignee: Konica Corporation (JP)

( * ) Notice: Subject to any disclaimer, the term of this patent is extended or adjusted under 35 U.S.C. 154(b) by 0 days.

(21) Appl. No.: 09/306,352

(22) Filed: May 6, 1999

(30) Foreign Application Priority Data

| May 7, 1998 | (JP) | ............................................. | 10-124675 |
| May 15, 1998 | (JP) | ............................................. | 10-133018 |
| Jun. 18, 1998 | (JP) | ............................................. | 10-171339 |
| Jul. 17, 1998 | (JP) | ............................................. | 10-219616 |

(51) Int. Cl.[7] ....................... G03B 17/02; G03B 17/24; G03B 11/00
(52) U.S. Cl. ........................... 396/6; 396/322; 396/335; 355/40
(58) Field of Search ............................ 396/6, 322, 335, 396/340; 355/40; 430/394

(56) References Cited

U.S. PATENT DOCUMENTS

| 5,187,512 A | * | 2/1993 | Kirkendall | ................... | 396/335 |
| 5,546,146 A | * | 8/1996 | Dobbs et al. | ................ | 396/322 |
| 5,565,936 A | * | 10/1996 | Kim et al. | ................... | 396/335 |
| 5,748,987 A | * | 5/1998 | Craig | ............................. | 396/6 |
| 5,758,216 A | * | 5/1998 | Arnold | ........................ | 396/311 |
| 5,765,062 A | * | 6/1998 | Dobbs et al. | ................ | 396/322 |
| 6,075,952 A | * | 6/2000 | Baek et al. | .................. | 396/322 |

* cited by examiner

*Primary Examiner*—Alan A. Mathews
(74) *Attorney, Agent, or Firm*—Cantor Colburn LLP

(57) ABSTRACT

A lens-fitted film unit includes: a main body; a photographic lens provided in the main body, having an aperture value; an aperture provided in the main body; a shutter provided in the main body, having a shutter speed; a photographic film loaded in the main body, having image frames each including an unexposed portion and a pre-exposed portion on which a latent image has been formed; and a masking member for masking the pre-exposed portion of the photographic film when a photographing operation is conducted. The latent image has been formed on the photographic film with a same exposure amount as that obtained when an object to be photographed having a brightness of not less than 10 and not more than 12.5 in terms of light values in which a photographic film whose ISO sensitivity is 100, is exposed to light with an aperture value of the photographic lens set by the aperture and with the shutter speed of the shutter.

13 Claims, 21 Drawing Sheets

LENS-FITTED FILM UNIT

BACKGROUND OF THE INVENTION

The present invention relates to a photographic film wherein latent images of characters and others are formed in advance, a method to manufacture the same, a photographic film for a lens-fitted film unit (or a single use camera) wherein latent images of characters and others are formed in advance, a method to manufacture the same, and to a lens-fitted film unit in which the photographic film mentioned above is loaded.

There is available on the market a lens-fitted film unit which is loaded with an unexposed film which has been exposed to images of characters in a belt shape to form latent images thereof in advance, and makes it possible to obtain a print wherein images of the characters are adjacent to an image plane formed through photographing.

In the lens-fitted film unit, a shutter speed is fixed to a single speed, a diaphragm has only an F-number at open aperture, and no exposure control mechanism is provided, because simplification and a low price are targets to be attained by the lens-fitted film unit. Therefore, over exposure is observed on an image obtained by the lens-fitted film unit through its photographing operation in the light, while under exposure is observed on an image obtained by the lens-fitted film unit through its photographing operation in the dark.

On the other hand, in the lens-fitted film unit stated above, images of characters are photographed on an unexposed film equally by a photographing device for exclusive use in advance. Therefore, an exposure amount is constant.

However, if an exposure amount with which images of characters are photographed is not stipulated within a prescribed range, there is caused a problem that exposure for the photographed image plane is appropriate, but that for images of characters is not appropriate. Thus, a photograph wherein exposure for the photographed image plane which is of great importance is not appropriate is caused by printing which causes both photographed image plane and images of characters to be balanced, which is a problem.

As an example of a lens-fitted film unit provided with film 105 having therein belt-shaped unexposed section 201 and belt-shaped exposed section 103 on which an image such as a character or the like has already been exposed as shown in FIG. 13, there is described the structure in Japanese Patent No. 2507221.

In this lens-fitted film unit, shutter 9 and exposure frame 11 are arranged between film 105 and lens 7, as shown in FIG. 14. Masking member (mask) 13 which covers the exposed section 103 of the film 105 is provided on the exposure frame 11 so that the exposed section 103 may be prevented from being exposed when the unexposed section 201 is exposed to light.

The lens-fitted film unit stated above is of the structure wherein an edge of the masking member 13 and an edge section of the exposed section agree positionally (forming a boundary between the exposed section and the unexposed section).

In this structure, it is necessary to cause a film width and a width of a film conveyance path to agree in size and to convey the film accurately. This makes production to be difficult and a load for film winding is increased, which is a problem.

When the regulation of the film conveyance path in the direction of a film width is eased, it sometimes occurs that the exposed section overlaps with a photographed image, or an unexposed section is created between the exposed section and a photographed image. In this case, there sometimes occurs a problem that edges of the image on the exposed section and of the image exposed to the unexposed section are irregular.

In the lens-fitted film unit mentioned above, a latent image section is shielded against light by a masking member so that the latent image may not be double-exposed to light in the course of photographing. In addition, the lens-fitted film unit is provided with an exposure aperture for forming a photographed image plane by causing a film to be exposed to light of an object, and rail-shaped members located respectively above and under the exposure aperture regulate the position of the film in its lateral direction. However, the rail-shaped members are formed in a way that a size of the rail-shaped members is naturally greater than that of a film in its lateral direction, and the rail-shaped members and a film width vary in terms of dimension. Further, a dimension of a latent image section in its lateral direction varies also in the course of forming a latent image in advance.

Due to this dimensional dispersion, it is very difficult to make an edge section of an image plane to be exposed and an edge section of a latent image section to agree accurately in terms of position, and the image plane to be exposed and the latent image section are overlapped each other to cause double-exposure, and an unexposed clearance section is generated between the image plane to be exposed and the latent image section, resulting in a black boundary line on a print.

In any case, it is impossible to avoid that a boundary line having a certain thickness is generated between the image plane to be exposed and the latent image section. When this boundary line is too thick, or a line width at right is different from that at left, or the boundary line is inclined, it looks awkward with a sense of incompatibility.

The invention further relates to a film-loaded cartridge housing therein an unexposed film, a manufacturing method for the same, a latent image exposing device for a film which makes an unexposed film to be exposed to a latent image, a manufacturing method for a lens-fitted film unit in which a film-loaded cartridge is loaded, and a lens-fitted film unit.

When assembling a lens-fitted film unit in which a film exposed to a latent image is loaded, a film having a prescribed length is manufactured first, and this film is exposed to a latent image. Then, the film exposed to latent images is divided into films each having prescribed number of frames. Further, the divided film is fixed on a film winding shaft and is loaded in a lens-fitted film unit.

However, as stated above, when manufacturing a lens-fitted film unit in which a film exposed to a latent image is loaded, the film to be exposed to latent images needs to be handled in a dark room until it is loaded in the lens-fitted film unit, which has made manufacturing facilities large. In addition, the method stated above is not suitable for the manufacture of diverse products in a small quantity, and in his method, a lot control is complicated, which has been a problem.

The first object of the invention is to propose a photographic film which makes it possible to obtain images with appropriate print density together with photographed images by stipulating an exposure amount for photographing images of characters on an unexposed film in advance within a prescribed range and thereby by forming latent images with prescribed density, a method to manufacture the aforesaid film, a photographic film for a lens-fitted film unit, a method to manufacture the same, and a lens-fitted film unit loaded with the film mentioned above.

The second object of the invention is to provide a lens-fitted film unit for which the manufacture is simple, and a film winding load is small.

Further, the object is to provide a lens-fitted film unit wherein an edge section of the image on the portion which is exposed in advance and that of the image on the unexposed section are clear.

One of the third object of the invention is to suggest a negative film and a lens-fitted film unit which have been achieved in view of the problem stated above and do not cause a awkward boundary line.

In the aforesaid lens-fitted film unit available on the market, the negative density on the entire latent image section is established to be high so that double-exposure on the image plane to be exposed and the latent image section may not be noticeable. However, when the negative density is established to be high, options for colors to be used for characters in comics are limited, which is a problem.

Further, when a color of the latent image section is only red or only yellow, showing one-sided color balance, a complementary color is added, when printing, to one color which covers a large area. Therefore, the color for the image plane to be exposed is deviated from the actual color, namely, the so-called color failure is caused.

Further, one of the third object of the invention is to suggest a negative film and a lens-fitted film unit wherein it is prevented that the color failure is caused on the image plane to be exposed by the color of the latent image section.

When characters of comics are drawn on the latent image section, this leads to the problem of copyright. It is therefore necessary to describe letters for the name of a production or the name of a publishing company for the comics, after acquiring an approval of the authorities concerned. When the negative density of the latent image section is set to be high and this section is exposed to letters, as stated above, the letters turn out to be light and to be very difficult to see on the print although the letters appear on the white background. The reason for this is presumed to be a flare which takes place in printing.

Further, one of the third object of the invention is to suggest a negative film and a lens-fitted film unit wherein letters on the latent image section can be visually recognized clearly on a print.

In the case of a conventional film having therein a latent image section, a latent image section has been exposed to form a long continuous belt-shaped form. When a film of this type is used for photographing, and then is sent to a photofinishing laboratory for processing and printing, there have occurred problems. Namely, although an unexposed clearance is generated between adjoining image planes to be exposed, no unexposed clearance is generated on the latent image section, therefore, frame detection has been impossible on a printer and automatic frame advancing has been impossible.

Further, one of the third object of the invention is to suggest a negative film and a lens-fitted film unit wherein film frames can surely be detected.

In addition, in a lens-fitted film unit, there is a tendency that a spool of a magazine is slightly lowered when film winding is completed, and thereby a film in the course of photographing also tends to be inclined slightly. As a result, the image plane to be exposed and the latent image section are not in parallel each other, resulting in a boundary line between the image plane to be exposed and the latent image section which changes gradually in terms of thickness, and turns out to be an awkward boundary line.

Further, one of the third object of the invention is to suggest a lens-fitted film unit wherein a thickness of a boundary line between the image plane to be exposed and the latent image section is made to be constant.

The fourth object of the invention is to provide a film-loaded cartridge and a manufacturing method therefor wherein manufacturing facilities can be made small, diverse products in a small quantity can be manufactured, and lots can be controlled easily, by exposing latent images on a film drawn out of a film-loaded cartridge and by rewinding the film exposed to the latent images, an apparatus to expose latent images on a film, a method to manufacture a lens-fitted film unit and a lens-fitted film unit.

The first object stated above can be solved by either one of the following Structures (1)–(5).

Structure (1): A lens-fitted film unit having therein a camera lens with a prescribed stop value and a shutter with a prescribed shutter speed, and housing therein a film on which latent images are formed on a part of each photographing frame and an exposure frame that is provided with a masking member which covers the latent images, wherein the aforesaid latent images are formed on the film stated above through an exposure amount which is the same as that obtained when an object with luminance ranging from 10 to 12.5 in terms of LV values in which the ISO speed of the film is 100 is exposed through a diaphragm having the aforesaid stop value and the shutter with a prescribed shutter speed.

Structure (2): A photographic film for a lens-fitted film unit to be loaded in a lens-fitted film unit having therein a camera lens with a prescribed stop value, a shutter with a prescribed shutter speed and an exposure frame provided thereon with a masking member which covers the latent images formed in advance on a photographing frame of the photographic film, wherein the aforesaid latent images are formed through an exposure amount which is the same as that obtained when an object with luminance ranging from 10 to 12.5 in terms of LV values in which the ISO speed of the film is 100 is exposed through a diaphragm having the aforesaid stop value and the shutter with a prescribed shutter speed.

Structure (3): A photographic film having a photographing frame on a part of which latent images are formed in advance, wherein the latent images are formed on the photographic film through an exposure amount ranging from L (EV) to (L+1) (EV) when an appropriate exposure amount determined by the film speed is L (EV).

Structure (4): A method to manufacture a photographic film for a lens-fitted film unit to be loaded in a lens-fitted film unit having therein a camera lens with a prescribed stop value, a shutter with a prescribed shutter speed and an exposure frame provided thereon with a masking member which covers the latent images formed in advance on a photographing frame of the photographic film, wherein there are provided processes to form an original image recorded on a transmitting film on the photographic film through an exposure amount which is the same as that obtained when an object with luminance ranging from 10 to 12.5 in terms of LV values in which the ISO speed of the film is 100 is exposed through a diaphragm having the aforesaid stop value and the shutter with a prescribed shutter speed, and to record the latent images.

Structure (5): A method to manufacture a photographic film having a photographing frame on a part of which latent images are formed in advance, wherein there are provided processes to form an original image recorded on a transmitting film on the photographic film through an exposure amount ranging from L (EV) to (L+1) (EV) when an appropriate exposure amount determined by the film speed is L (EV), and to record the latent images.

The structure to attain the second object is a lens-fitted film unit provided with a lens having an unexposed section and an exposed section wherein an exposure frame is provided with a masking member which covers an range smaller than a range of the exposed section.

The third object stated above can be attained by either one of Structures (1)–(11) described below.

Structure (1): A negative film having thereon a latent image section on which a prescribed latent image is exposed, the latent image section being shielded against light by a masking member when the negative film is loaded in a lens-fitted film unit, wherein a boundary portion whose negative density gradually changes is provided on the part of the latent image section closer to an image plane to be exposed which is to be exposed to an object image in the course of photographing.

Structure (2): A lens-fitted film unit which is loaded with a negative film having thereon a latent image section that is exposed to a prescribed latent image, and is provided with a masking member which shields the latent image section against light, wherein a boundary portion whose negative density gradually changes is provided on the part of the latent image section closer to an image plane to be exposed which is to be exposed to an object image in the course of photographing.

Structure (3): A negative film having thereon a latent image section on which a prescribed latent image is exposed, the latent image section being shielded against light by a masking member when the negative film is loaded in a lens-fitted film unit, wherein the latent image section is totally formed to have neutral gray density with reflection factor of about 18%.

Structure (4): A lens-fitted film unit which is loaded with a negative film having thereon a latent image section that is exposed to a prescribed latent image, and is provided with a masking member which shields the latent image section against light, wherein the latent image section is totally formed to have neutral gray density with reflection factor of about 18%.

Structure (5): A negative film having thereon a latent image section on which a prescribed latent image is exposed, the latent image section being shielded against light by a masking member when the negative film is loaded in a lens-fitted film unit, wherein the latent image section has negative density of either one of blue density of not more than 2.5, green density of not more than 2.1 and red density of not more than 1.7, and prescribed letters are formed on the latent image.

Structure (6): A lens-fitted film unit which is loaded with a negative film having thereon a latent image section that is exposed to a prescribed latent image, and is provided with a masking member which shields the latent image section against light, wherein the latent image section has negative density of either one of blue density of not more than 2.5, green density of not more than 2.1 and red density of not more than 1.7, and prescribed letters are formed on the latent image.

Structure (7): A negative film having thereon a latent image section on which a prescribed latent image is exposed, the latent image section being shielded against light by a masking member when the negative film is loaded in a lens-fitted film unit, wherein the latent image section is provided with an area which has negative density of either one of blue density of not more than 2.5, green density of not more than 2.1 and red density of not more than 1.7, and prescribed letters are formed on the area.

Structure (8): A lens-fitted film unit which is loaded with a negative film having thereon a latent image section that is exposed to a prescribed latent image, and is provided with a masking member which shields the latent image section against light, wherein the latent image section is provided with an area which has negative density of either one of blue density of not more than 2.5, green density of not more than 2.1 and red density of not more than 1.7, and prescribed letters are formed on the area.

Structure (9): A negative film having thereon a latent image section on which a prescribed latent image is exposed, the latent image section being shielded against light by a masking member when the negative film is loaded in a lens-fitted film unit, wherein a length of the longitudinal side of the latent image is within a range from 90% to 104% of the length of the longitudinal side of an image plane to be exposed which is to be exposed to an object image in the course of photographing.

Structure (10): A lens-fitted film unit which is loaded with a negative film having thereon a latent image section that is exposed to a prescribed latent image, and is provided with a masking member which shields the latent image section against light, wherein a length of the longitudinal side of the latent image is within a range from 90% to 104% of the length of the longitudinal side of an photographed image plane which is to be exposed to an object image in the course of photographing.

Structure (11): A lens-fitted film unit which is loaded with a negative film having thereon a latent image section that is exposed to a prescribed latent image, and is provided with a masking member which shields the latent image section against light, wherein an exposure aperture through which the negative film is exposed to an image of an object in photographing and an exposed image plane is formed, is tilted in accordance with inclination of a film which is lowered in the film winding direction to be inclined.

The fourth object stated above can be attained by either one of Structures (1)–(25) described below.

Structure (1): A film-loaded cartridge housing therein a film, wherein there is provided, at the tip portion of the film, a marking which shows that a latent image is formed on a part of a portion corresponding to a frame for photographing in advance.

Structure (2): A manufacturing method for a film-loaded cartridge, wherein there are provided a process to hold a cartridge housing therein an unexposed film by means of a holding means, a process to draw a film out of the held cartridge, a process to form a latent image on the film thus drawn out, and a process to rewind the film on which a latent image is formed in the cartridge.

Structure (3): The manufacturing method for a film-loaded cartridge according to Structure (2), wherein the process to draw out a film has therein a process to pinch, by means of a pinching means, the film which is extruded from the cartridge held by the holding means, and a process to change an interval between the pinching means and the holding means.

Structure (4): The manufacturing method for a film-loaded cartridge according to Structure (3), wherein the maximum value of the interval between the pinching means and the holding means is equal to or greater than a space which is formed when the film is completely drawn out of the cartridge under the condition that one end of the film is fixed on a spool that is housed in the cartridge.

Structure (5): The manufacturing method for a film-loaded cartridge according to Structure (3), wherein the interval between the pinching means and the holding means is changed by moving the pinching means from the holding means in the direction to draw out the film.

Structure (6): The manufacturing method for a film-loaded cartridge according to Structure (3), wherein the pinching means returns to its initial position where the film is drawn out, by traveling along a path which is different from the path for drawing out the film.

Structure (7): The manufacturing method for a film-loaded cartridge according to Structure (2), wherein the process to form the latent image has therein a process to press the drawn-out film against an original image sheet on which an original image is recorded, and a process to expose the film pressed on the original image sheet through the original image.

Structure (8): The manufacturing method for a film-loaded cartridge according to Structure (7), wherein the film is drawn out while keeping a prescribed distance from the original image sheet.

Structure (9): The manufacturing method for a film-loaded cartridge according to Structure (2), wherein a process to conduct marking which shows that a latent image has been formed on the film is provided after the process to form the latent image.

Structure (10): An apparatus to form a latent image on a film wherein a holding means which holds a cartridge housing therein an unexposed film, a drawing-out means which draws a film out of a cartridge held by the holding means, a forming means which forms a latent image on the film drawn out by the drawing-out means, and a rewinding means which rewinds into the cartridge the film on which a latent image is formed by the forming means, are provided.

Structure (11): The apparatus to form a latent image on a film according to Structure (10), wherein the rewinding means has therein a driving means which drives a spool in the cartridge to rotate.

Structure (12): The apparatus to form a latent image on a film according to Structure 10, wherein the drawing-out means has therein a pinching means to pinch a film extruded from the cartridge held by the holding means and an interval changing means to change an interval between the pinching means and the holding means.

Structure (13): The apparatus to form a latent image on a film according to Structure (12), wherein the maximum value of the interval between the pinching means and the holding means is equal to or greater than a space which is formed when the film is completely drawn out of the cartridge under the condition that one end of the film is fixed on a spool that is housed in the cartridge.

Structure (14): The apparatus to form a latent image on a film according to Structure (12), wherein the interval chaining means moves the pinching means from the holding means in the direction of drawing-out of the film.

Structure (15): The apparatus to form a latent image on a film according to Structure (12), wherein there are provided a detection means which detects if the tip portion of the film is drawn out to the prescribed position by the drawing-out means, and a warning means which gives warning when the detection means detects that the tip portion is not drawn out to the prescribed position.

Structure (16): The apparatus to form a latent image on a film according to Structure (12), wherein the pinching means wherein the pinching means returns to its initial position where the film is drawn out, by traveling along a path which is different from the path for drawing out the film.

Structure (17): The apparatus to form a latent image on a film according to Structure (10), wherein the forming means has therein a holding member which holds an original image sheet on which an original image is recorded, a pressing means which presses the film drawn out by the drawing-out means against the original image sheet held by the holding means, and a light source by which the film pressed against the original image sheet by the pressing means is exposed to light through the original image.

Structure (18): The apparatus to form a latent image on a film according to Structure (17), wherein there are provided a detection means to detect if light is emitted from the light source and a warning means which gives warning when the detection means detects that light is not emitted from the light source.

Structure (19): The apparatus to form a latent image on a film according to Structure (17), wherein the film is drawn out while keeping a prescribed distance from the original image sheet.

Structure (20): The apparatus to form a latent image on a film according to Structure (10), wherein there is provided a process to conduct marking which shows that a latent image has been formed on the film, after the latent image is formed on the film by the forming means.

Structure (21): The apparatus to form a latent image on a film according to Structure (10), wherein the holding means can hold plural cartridges, and the drawing-out means can draw films out of the plural cartridges held by the holding means simultaneously.

Structure (22): A manufacturing method for a lens-fitted film unit having therein a process to hold a cartridge housing therein an unexposed film, a process to draw a film out of the held cartridge, a process to form a latent image on the film drawn out, a process to rewind the film on which a latent image is formed into the cartridge, a process to take out the cartridge into which the film is rewound, a process to fix on a film-take-up shaft, one end of the film which is housed in the cartridge taken out and is formed with a latent image, a process to rotate the film-take-up shaft and to draw the film out of the cartridge to form a film roll on the film-take-up shaft, a process to load the film roll and the cartridge in the unit main body, and a process to mount, on the unit main body, a cover which covers the film roll and the cartridge both loaded in the unit main body.

Structure (23): A manufacturing method for a lens-fitted film unit having therein a process to hold a cartridge housing therein an unexposed film, a process to draw a film out of the held cartridge, a process to form a latent image on the film drawn out, a process to rewind the film on which a latent image is formed into the cartridge, a process to take out the cartridge into which the film is rewound, a process to fix , on a film-take-up shaft, one end of the film which is housed in the cartridge taken out and is formed with a latent image, a process to load the film-take-up shaft and the cartridge in the unit main body, a process to mount, on the unit main body, a cover which covers the film-take-up shaft and the cartridge both loaded in the unit main body, and a process to rotate the film-take-up shaft and to draw the film out of the cartridge to form a film roll on the film-take-up shaft, a process to load the film roll and the cartridge in the unit main body, and a process to mount, on the unit main body, a cover which covers the film roll and the cartridge both loaded in the unit main body a process to rotate the film-take-up shaft covered by the cover and to draw the film out of the cartridge to form a film roll on the film-take-up shaft.

Structure (24): A manufacturing method for a lens-fitted film unit having therein a process to hold a cartridge housing therein an unexposed film, a process to draw a film out of the held cartridge, a process to form a latent image on the film drawn out, a process to rewind the film on which a latent image is formed into the cartridge, a process to take out the cartridge into which the film is rewound, a process to fix, on a film-take-up shaft, one end of the film which is housed in the cartridge taken out and is formed with a latent image, a process to load the film-take-up shaft and the cartridge in the unit main body, a process to rotate the film-take-up shaft loaded in the unit main body and to draw the film out of the cartridge to form a film roll on the film-take-up shaft, and a process to mount, on the unit main body, the cover which covers the film roll and the cartridge.

Structure (25): A lens-fitted film unit manufactured by a manufacturing method for a lens-fitted film unit described in either one of Structures (22)–(24).

DETAILED DESCRIPTION OF THE PREFERRED EMBODIMENT

Embodiment of the Invention

Figure 1:
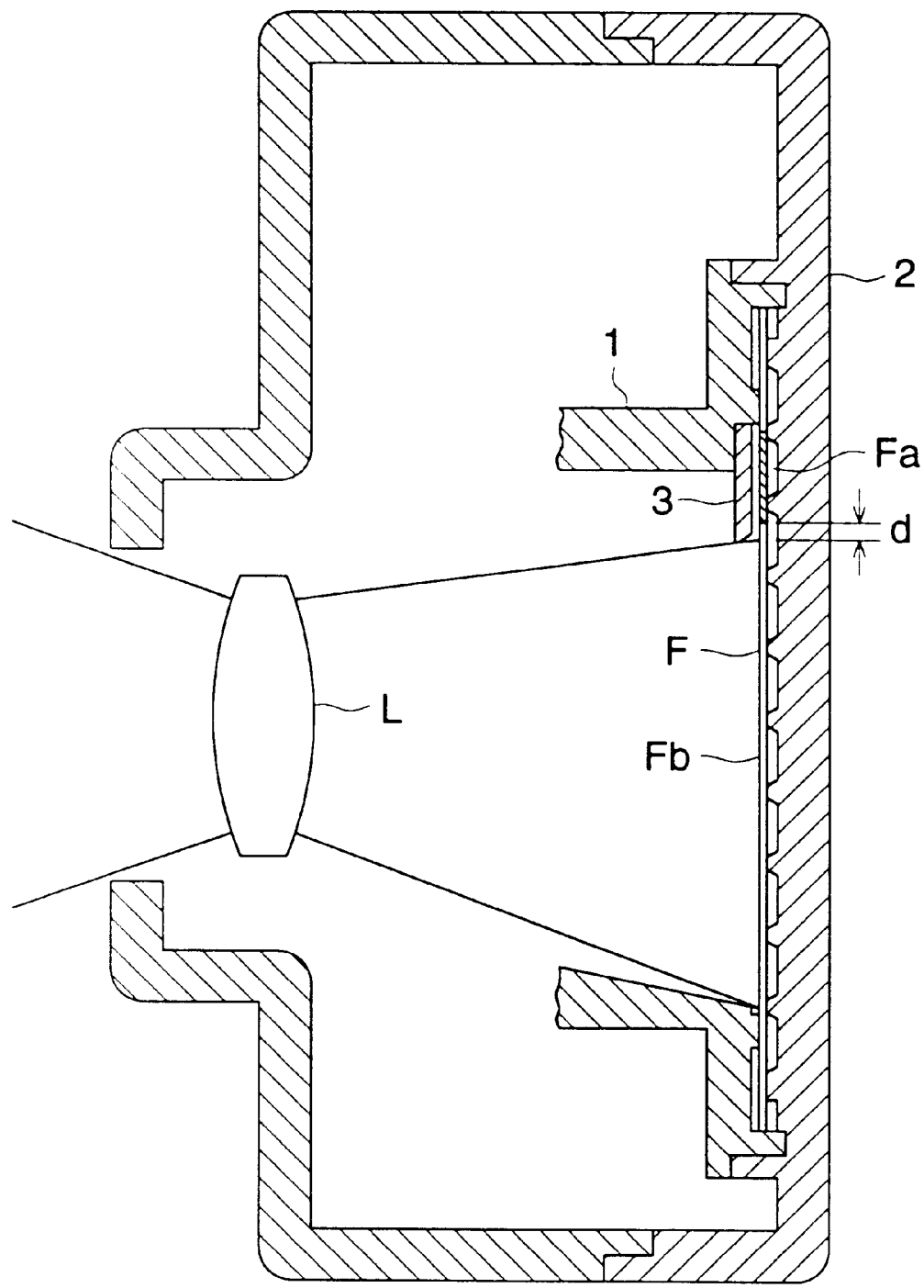
FIG. 1 is a longitudinal section of a lens-fitted film unit.

An embodiment to attain the first object in a lens-fitted film unit of the invention will be explained as follows, referring to the drawings.

Figure 2:
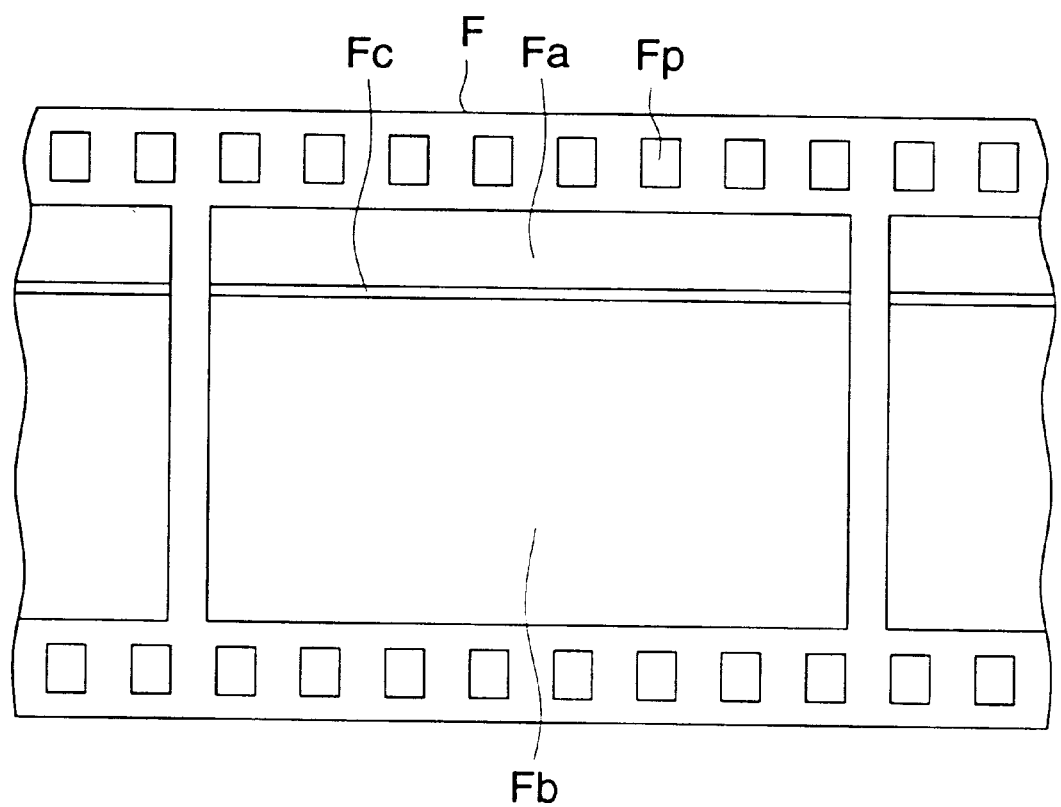
FIG. 2 is a diagram of a negative film.

First of all, configuration of a lens-fitted film unit used in the invention will be explained as follows, referring to FIGS. 1 and 2. FIG. 1 is a longitudinal section of a lens-fitted film unit, and FIG. 2 is a diagram of a negative film.

In FIG. 1, unexposed film F is loaded in the lens-fitted film unit in advance in the manufacturing process, and a photographing frame on the film F is exposed to belt-shaped images of characters in advance, and latent images are formed thereon. Incidentally, the photographing frame is a range for image recording on a film corresponding to the range printed on a photographic paper when making prints. A portion where latent images are formed on the photographing frame is called latent image section Fa. The latent image section Fa is formed to be a long belt shape extended from the end of the longer side of a photographed image plane which is formed by an ordinary lens-fitted film unit, as shown in FIG. 2.

It is preferable that the latent image sections Fa are formed intermittently so that each of them may correspond to each of all frames, having a length which is nearly the same as the longer side of the photographed image plane. It is also possible to form the latent image section Fa continuously to correspond to all frames. In any case, it is necessary to make perforation Fp of film F engaging with an unillustrated sprocket to be constant in terms of its position, so that characters in latent image section Fa may be positioned accurately at prescribed location on the exposure frame on unit main body 1.

The film F is held by unit main body 1 and an inner surface of rear cover 2 at a focused position for camera lens L. When photographing, the film F is exposed to light of an object through camera lens L, resulting in formation of photographed image plane Fb on the film, but the latent image section Fa is not exposed to light because of light shielding conducted by masking plate 3 (the masking member) provided on unit main body 1.

Incidentally, when the number of lenses is two or more, it is also possible to provide an aperture between the lenses.

In FIG. 1, the latent image section Fa is shielded against light by masking plate 3 with surplus width d. Therefore, the surplus width d results in unexposed belt-shaped section Fc.

However, even when double exposure is caused on a part of the latent image section Fa when the surplus width d is made to be zero without being limited by the foregoing, or when a part of the latent image section Fa is not shielded by the masking plate 3, the portion of the double exposure results in a boundary line between a portion where the latent image section Fa is visualized and photographed image plane Fb, which is not problematic in practical use.

Since simplification and a low price are targets to be attained by the lens-fitted film unit, camera lens L is composed of a single or two plastic lenses to be a lens having a great F-number at open aperture, and it is of fixed focus, having no focusing mechanism. Further, a shutter speed is fixed to a single speed, a diaphragm has only an F-number at open aperture, and no exposure control mechanism is provided. For the purpose to make up for such great F-number and thereby to make the depth of field to be broad, a film having ISO speed of 400 is used.

Figure 3:
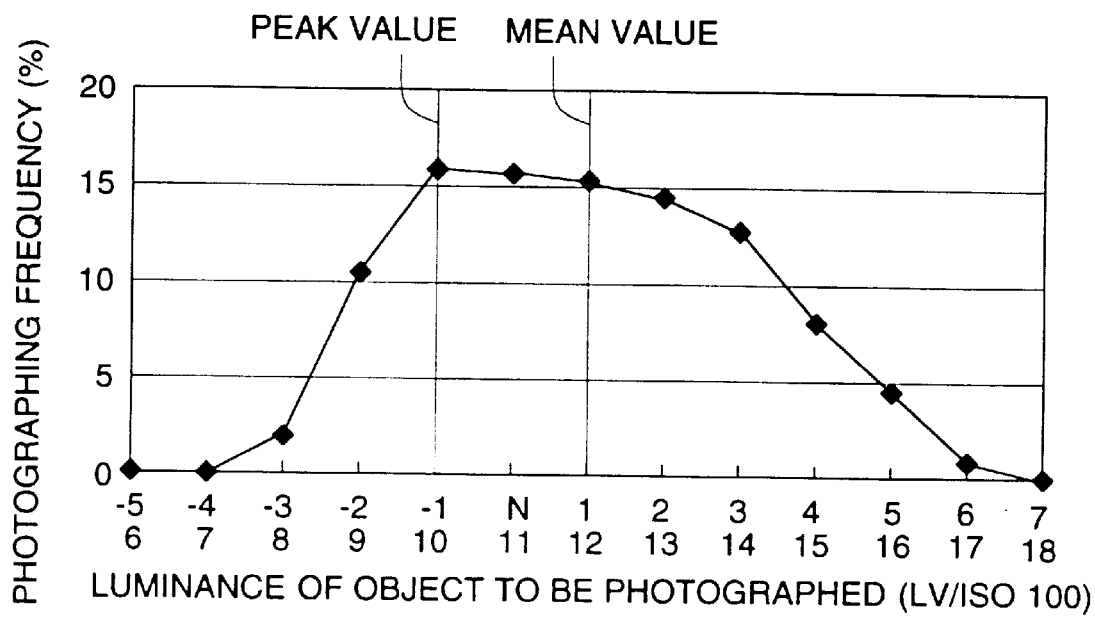
FIG. 3 is an exposure investigation graph of a print obtained through photographing by a lens-fitted film unit used by a user.

Now, the specifications of the lens-fitted film unit manufactured by our company are as follows.
Film speed: ISO 400
Shutter speed: 1/90
F-number at open aperture: 9.5
Standard exposure amount: 11 EV Results of investigation of exposure on prints obtained by a user through its photographing by the use of the lens-fitted film unit mentioned above are shown on the graph in FIG. 3. In FIG. 3, the lower line of figures representing the axis of abscissas indicates values of luminance of object to be photographed (LV/ISO 100), and N at the center of the upper line of figures representing the axis of abscissas indicates dispersion of the luminance of object to be photographed in which luminance of object to be photographed 11 LV corresponding to standard exposure amount 11 EV is centered. The axis of ordinates represents photographing frequency (%) at each luminance.

Though some prints obtained through electronic flash photographing are included in the present investigation, analyses of prints conducted by our company separately indicate that an influence of electronic flash photographing is small.

In the graph shown in FIG. 3, if an object having luminance of object to be photographed of not more than 12.5 LV obtained by adding 0.5 LV to the luminance of object to be photographed 12 LV representing a "mean value" is formed, at luminance of object to be photographed 10 LV representing a peak value or more, as a latent image on the latent image section Fa using 11 EV exposure amount, density balance between the photographed image and the latent image turns out to be appropriate, and sufficient results are obtained in both color reproducibility and color balance, restraining the exposure wherein one side is inappropriate.

In addition, if the upper limit is set to luminance of object to be photographed 12 LV in the luminance of object to be photographed of 11 LV or more, considering characteristics of a negative film having a wide latitude on the high luminance side, satisfactory results are obtained.

The foregoing is an occasion of a lens-fitted film unit having no exposure controlling mechanism, and the same investigation as in the occasion was conducted in our company on prints obtained through photographing by an ordinary camera equipped with an automatic exposure mechanism. Results of the investigation are shown on the graph in FIG. 4.

Figure 4:
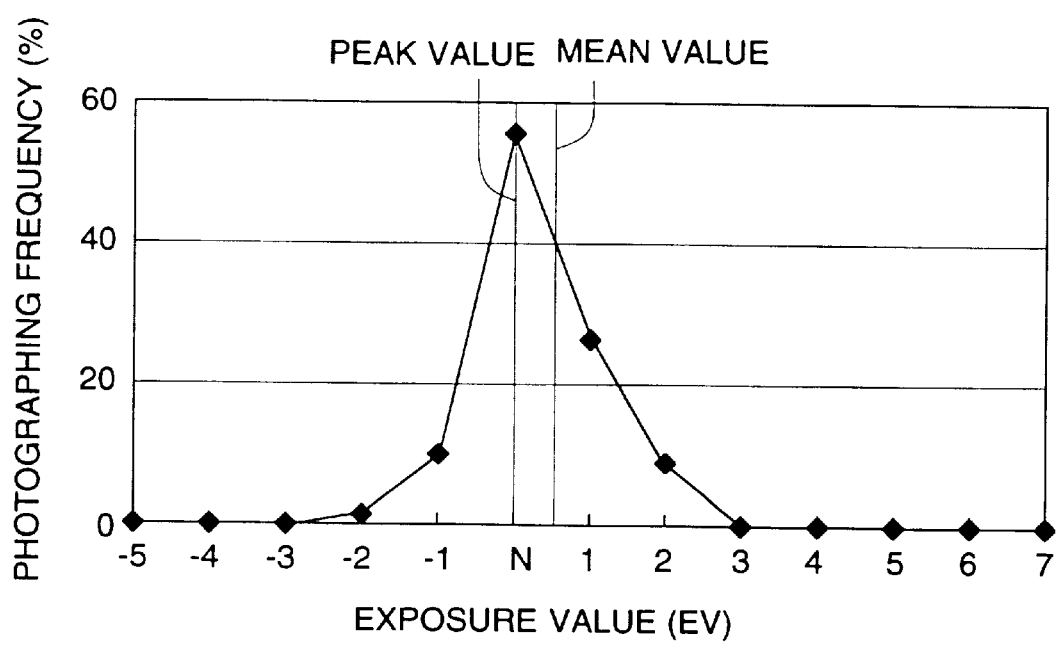
FIG. 4 is an exposure investigation graph of a print obtained through photographing by a camera equipped with an exposure control mechanism used by a user.

In FIG. 4, the axis of abscissas represents an exposure amount, and the axis of ordinates represents photographing frequency for each exposure amount. In FIG. 4, if a latent image is formed, with a lower limit of exposure amount N representing a "peak value" which is regarded as an appropriate exposure amount and with an upper limit of exposure amount+1.0 EV obtained by adding 0.5 EV to exposure amount+0.5 EV representing a "mean value", considering characteristics of a negative film having a wide latitude on the high luminance side, density balance between the photographed image and the latent image turns out to be appropriate, and sufficient results are obtained in both color reproducibility and color balance, eliminating the exposure wherein one side is inappropriate.

Further, better results are obtained when using the lower limit of exposure amount N representing a "peak value" and the upper limit of exposure amount+0.5 EV.

Incidentally, an exposure amount of the latent image stated above is one to determine image density after film development, in other words, it is possible to determine an exposure amount of a latent image by developing a film under ordinary processing conditions and by measuring a mean density of the latent image section.

As a method to form a latent image, it is preferable in terms of mass production to form on a film an original image recorded on a transmitting film and thereby to record a latent image, although it is also possible to photograph a prescribed object directly on each film.

The explanation stated above is on the assumption that stop value obtained from the diaphragm and lens of the lens-fitted film unit and shutter speed of the shutter are fixed. However, stop value and shutter speed may also be variable. When making the stop value and the shutter speed of a lens-fitted film unit to be variable in photographing with an electronic flash and without an electronic flash, it is preferable to photograph based on the stop value and the shutter speed in photographing without an electronic flash.

An image frame section of the invention means a portion which turns into an image frame to be printed on a print material after photographing and film processing.

Owing to a lens-fitted film unit described in Structure (1), a photographic film for a lens-fitted film unit described in Structure (2) and a photographic film described in Structure (3), density balance between the photographed image and images such as characters turns out to be appropriate, and sufficient results are obtained in both color reproducibility and color balance, restraining the exposure wherein one side is inappropriate.

Owing to a method to manufacture a photographic film for a lens-fitted film unit described in Structure (4) and a method to manufacture a photographic film described in Structure (5), density balance between the photographed image and images such as characters turns out to be appropriate. Therefore, it is possible to manufacture a photographic film which makes it possible to obtain a print wherein sufficient results are obtained in both color reproducibility and color balance, and exposure wherein one side is inappropriate can be reduced.

A lens-fitted film unit of the embodiment to attain the second object will be explained as follows, referring to the drawings.

Figure 5:
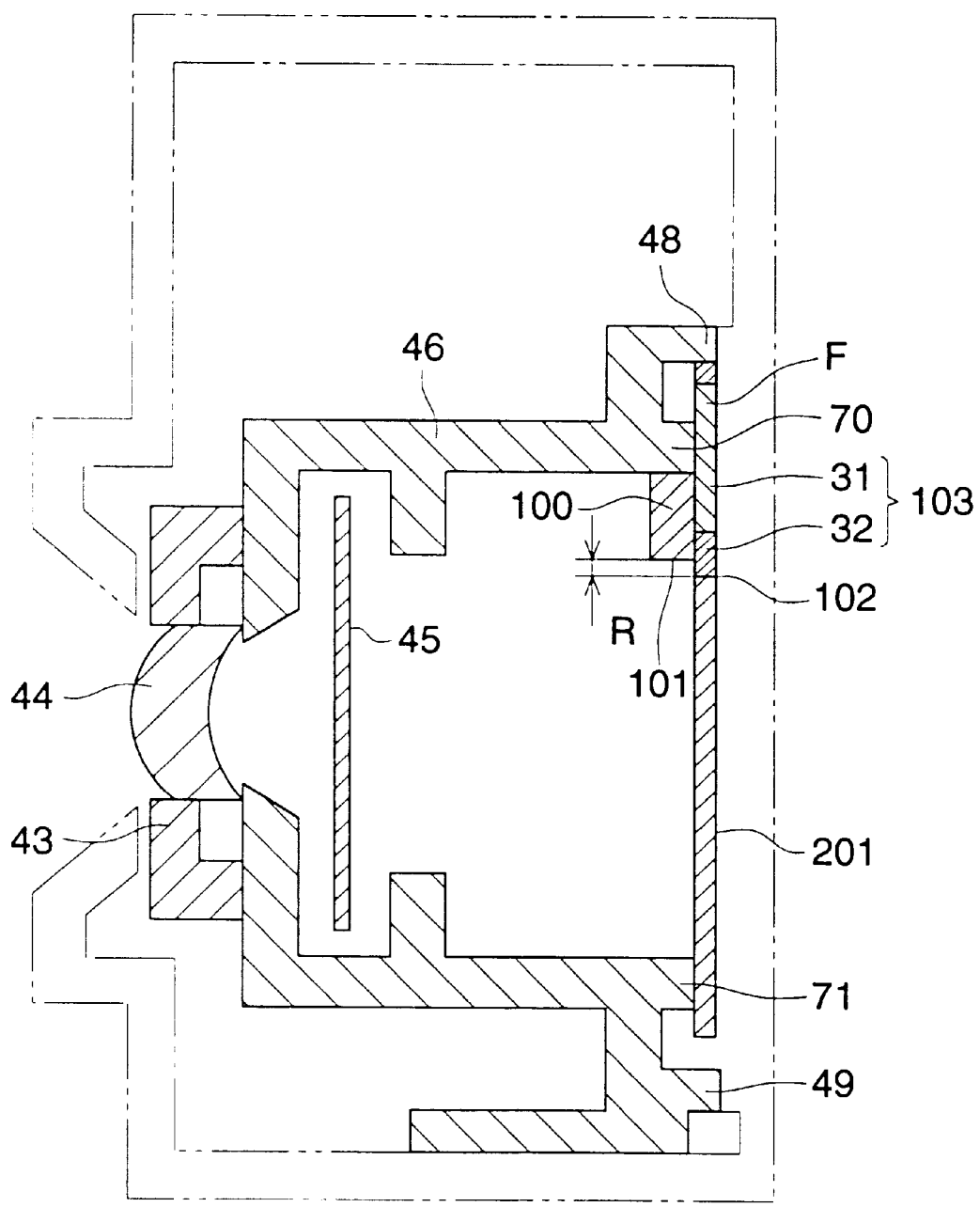
FIG. 5 is an enlarged view of main parts of the invention in an embodiment.
Figure 6:
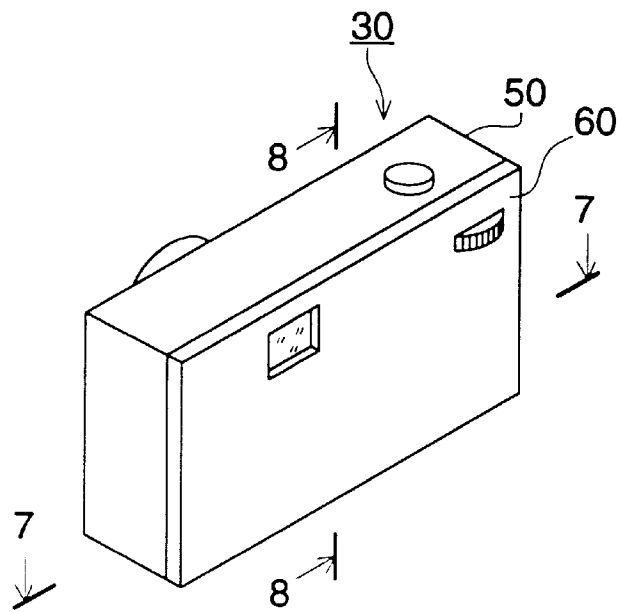
FIG. 6 is a perspective view showing a lens-fitted film unit in the present embodiment viewed from its rear side.
Figure 7:
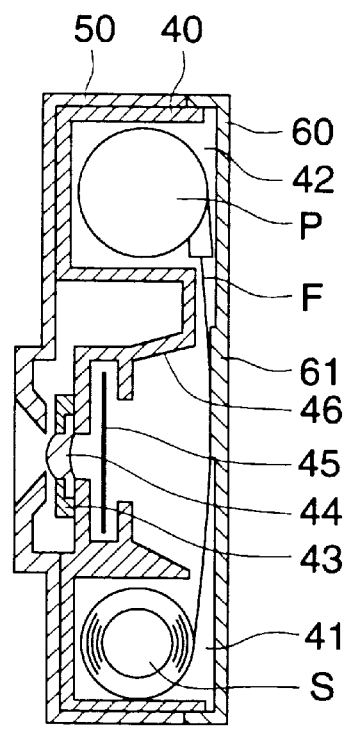
FIG. 7 is a sectional view taken on line 7—7 in FIG. 6.
Figure 8:
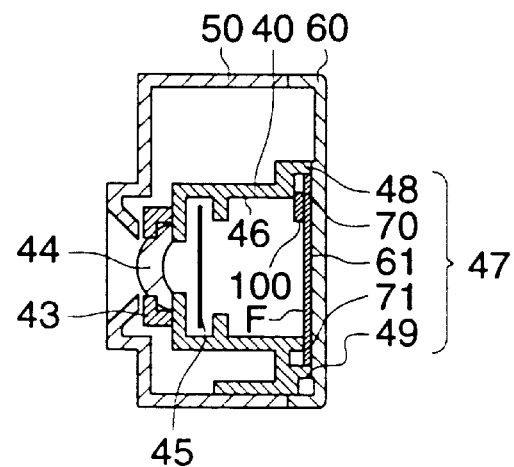
FIG. 8 is a sectional view taken on line 78–8 in FIG. 6.
Figure 9:
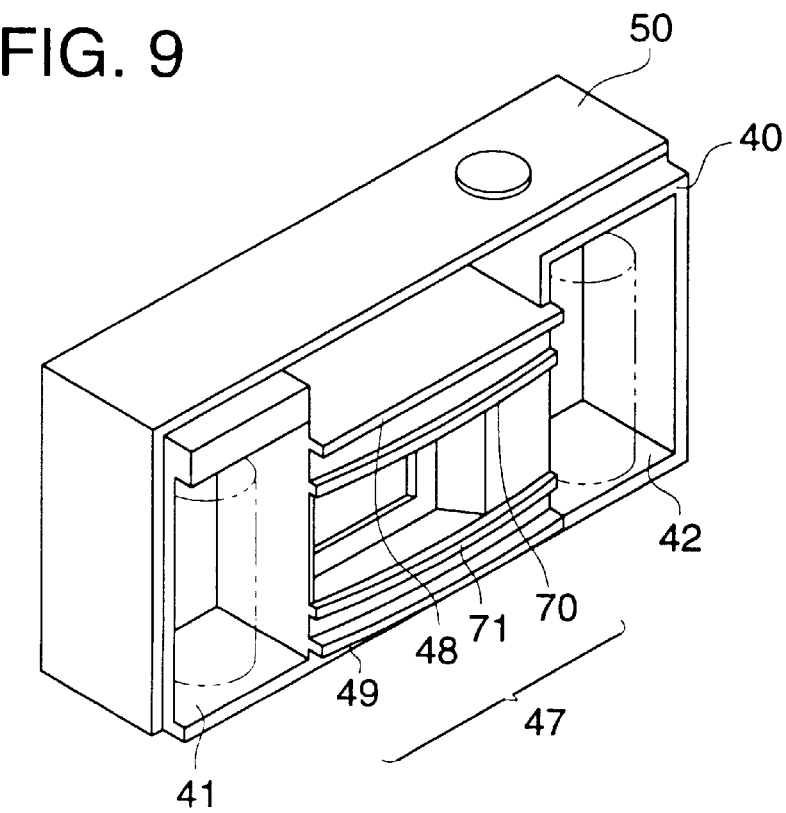
FIG. 9 is a perspective view showing what is shown in FIG. 5 from which a rear cover is removed.

The total structure of a lens-fitted film unit of the invention will be explained, referring to FIGS. 6–9. FIG. 6 is a perspective view showing a lens-fitted film unit in the present embodiment viewed from its rear side, FIG. 7 is a sectional view taken on line 7—7 in FIG. 6, FIG. 8 is a sectional view taken on line 8—8 in FIG. 6, and FIG. 9 is a perspective view showing what is shown in FIG. 5 from which a rear cover is removed.

Lens-fitted film unit 30 is roughly composed of main body 40, front cover 50 which covers the main body 40 and rear cover 60.

On the main body 40, there are provided spool chamber 41 in which a spool around which unexposed film F is wound is provided, and magazine chamber 42 in which magazine P around which the film F which has been exposed is wound is housed.

On the central portion of the main body 40, there is provided lens 44 by the use of lens holder 43. On the rear side of the lens 44, there is provided shutter 45, and on the rear side of the shutter 45, there is formed exposure frame 46 which determines an exposure range on the film F for a light flux passing through the lens 44.

The film F is guided through film conveyance path 47 which is formed on the part closer to the film on the exposure frame 46 and is taken into magazine P from spool S.

The film conveyance path 47 is formed by a guide which guides film F in its lateral direction and by a guide which guides in the direction perpendicular to the exposure plane of the film F.

A guide in the lateral direction of the film F is formed to be above and below the exposure frame 46, and it is composed of upper guide 48 which guides the upper edge of the film and lower guide 49 which guides the lower edge of the film F.

A guide which guides in the direction perpendicular to the exposure plane of film F is formed to be above and below the exposure frame 46, it is formed on two rails 70 and 71 which come in contact with an exposure plane of the film F and on rear cover 60, and is composed of the exposure plane of the film F and of convex plane 61 which touches the side of the film opposite to the exposure plane.

Next, an inventive portion of the present embodiment will be explained referring to FIG. 5. FIG. 5 is an enlarged view of main parts of the inventive portion.

Figure 10:
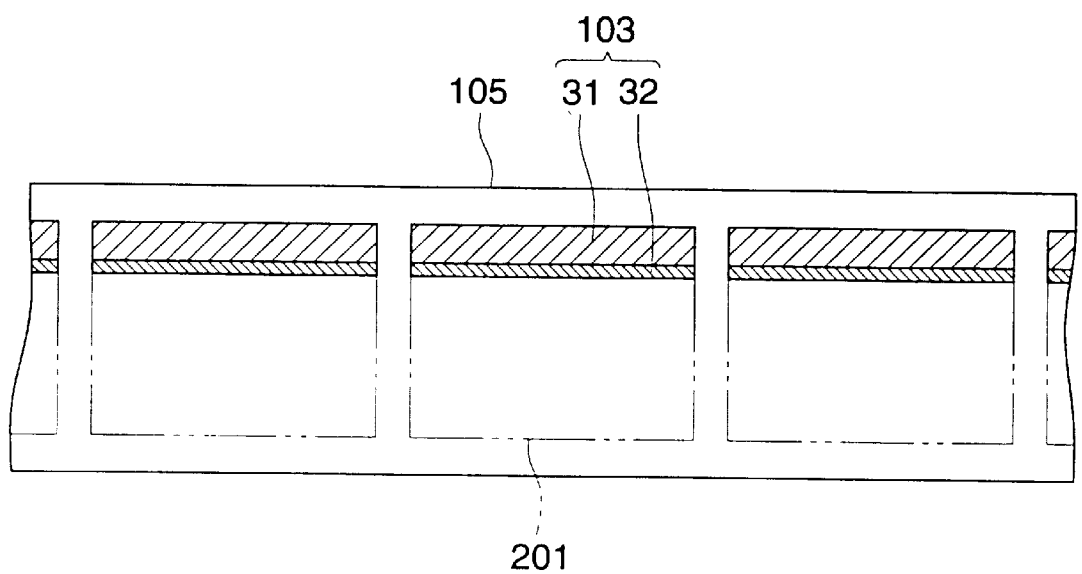
FIG. 10 is a diagram illustrating film 5 shown in FIG. 5.

As shown in FIG. 10, film F has therein unexposed section 201 and exposed section 103 which has already been exposed to images in advance.

The exposed section 103 is composed of image section 31 which has already been exposed to images such as characters in advance, and of intensely exposed section 32 which has been exposed to while light on the part of unexposed section 201.

Further, on film 105 in the present embodiment, exposed section 103 is formed only at the portion corresponding to an area where an image frame is formed in the course of photographing.

On the exposure frame 46, there is formed masking member 100 whose leading edge 101 is positioned at the intensely exposed section 32 of the exposed section 103 on the film F.

A length of the masking member 100 is established so that interval R between edge section 101 of the masking member 100 and boundary 102 between unexposed section 201 and exposed section 103 of film F may be within a range of 0.1 mm–0.3 mm under the condition that film F is shifted so that an end of film F may touch upper guide 48 on the part of edge section 101 of the masking member 100 as shown in FIG. 5, and a width of the intensely exposed section 32 is set to be within a range of 0.5 mm–0.8 mm.

Incidentally, it is more preferable that the interval R is within a range of 0.1 mm–0.2 mm and a width of the intensely exposed section 32 is within a range of 0.5 mm–0.8 mm.

Figure 11:
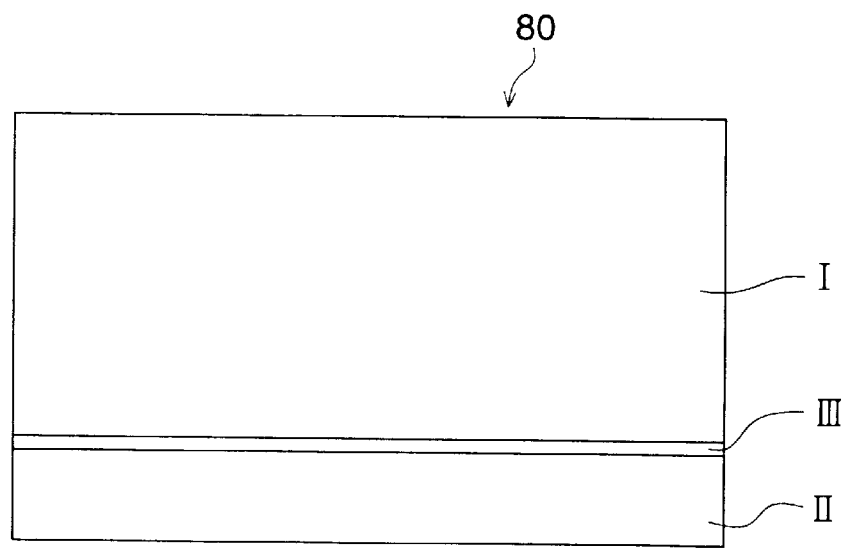
FIG. 11 is a diagram showing a print obtained through photographing by the use of a lens-fitted film unit having the structure shown in FIG. 5.

When an image is photographed by the use of the lens-fitted film unit having the aforesaid structure, and printing is conducted on a print material, print 80 shown in FIG. 11 can be obtained. In the drawing, area I is an area (image area of the unexposed section 201) where photographed images photographed by the use of the lens-fitted film unit are printed, area II is an area of image section 31 of the exposed section 103, and area III is an area of "low density section (white streaks)" which is formed by the intensely exposed section 32 of the exposed section 103.

In the case of a lens-fitted film unit having the aforesaid structure, masking member 100 covers a range smaller than a range of exposed section 103 of film F, and thus, it is possible to make a width of film conveyance path 47, namely, an interval between the upper guide 48 and the lower guide 49 to be larger than a width of film F, thereby, manufacturing is easy and a load for winding film F can be made smaller.

The intensely exposed section 32 formed on the part closer to the unexposed portion on the exposed section 103 turns into "low density section (white streaks)" formed between an image of the exposed section and an image of the unexposed section on a print, thereby an edge section between the image of the exposed section 103 and photographed image of the unexposed section 201 becomes sharp and clear, resulting in an attractive print.

Even when a photographed image of unexposed section 201 overlaps with the intensely exposed section 32, it does not appear on the print.

Further, when a length of the masking member 100 is established so that interval R between edge section 101 of the masking member 100 and boundary 102 between unexposed section 201 and exposed section 103 of film F may be within a range of 0.1 mm–0.3 mm under the condition that film F is shifted so that an end of film F may touch upper guide 48 on the part of edge section 101 of the masking member 100, and a width of the intensely exposed section 32 is set to be within a range of 0.5 mm–0.8 mm, it is possible to position the edge section 101 of the masking member 100 within a width of the intensely exposed section 32 even when there is an ordinary play in the lateral direction for film F conveyed along the film conveyance path 47.

Furthermore, with regard to film 105, exposed section 103 is formed only on the portion corresponding to an area where an image frame is formed in the course of photographing.

Owing to the structure stated above, a frame position can be easily detected by the forming apparatus on the occasion of printing.

Incidentally, the invention is not limited to the embodiment stated above. In the structure in the embodiment stated above, masking member 100 is mounted on exposure frame 46. However, it is also possible to form the exposure frame 46 and the masking member 100 solidly.

Figure 12:
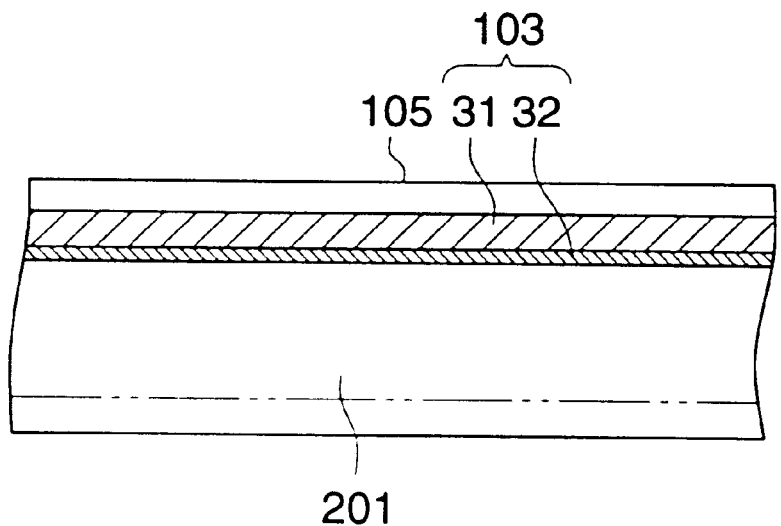
FIG. 12 is a diagram illustrating a film of another embodiment.
Figure 13:
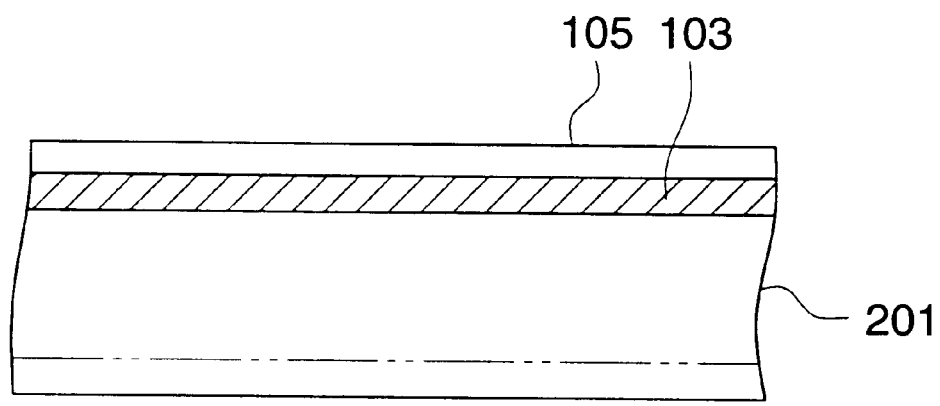
FIG. 13 is a diagram illustrating a film having an exposed section.
Figure 14:
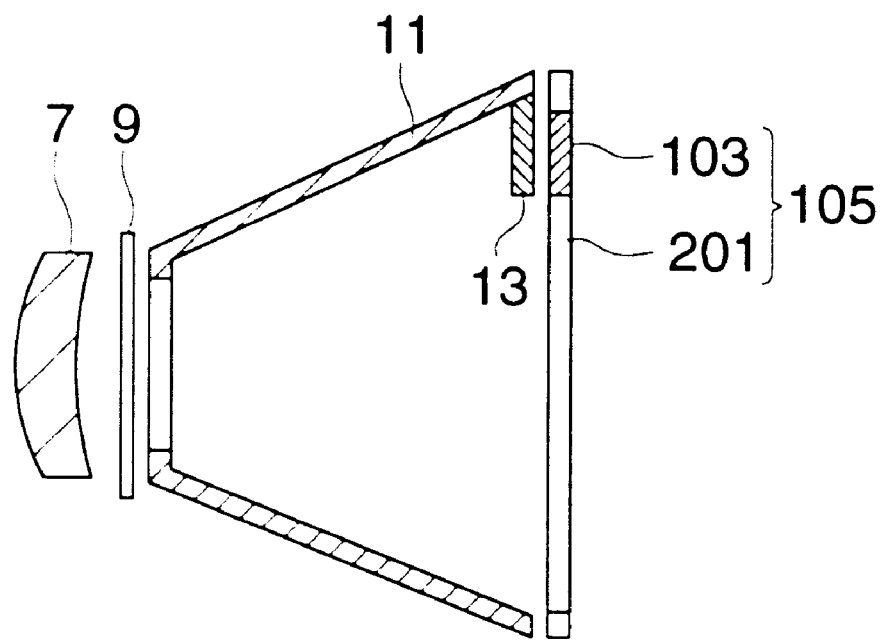
FIG. 14 is a structural diagram of a conventional lens-fitted film unit.

Though exposed section 103 is formed only on the portion corresponding to an area where an image frame is formed on film 105 in the present embodiment in the course of photographing as shown in FIG. 10, it is also possible to form belt-shaped exposed section 103 in the longitudinal direction of the film 105 as shown in FIG. 12.

In the structure stated above, owing to the masking member which covers a range smaller than a range of the exposed section of the film, it is possible to make a width of film conveyance path to be larger than a width of film, thereby, manufacturing is easy and a load for winding film F can be made smaller.

An embodiment to attain the third object in the lens-fitted film unit of the invention will be explained as follows, referring the drawings.

Figure 15:
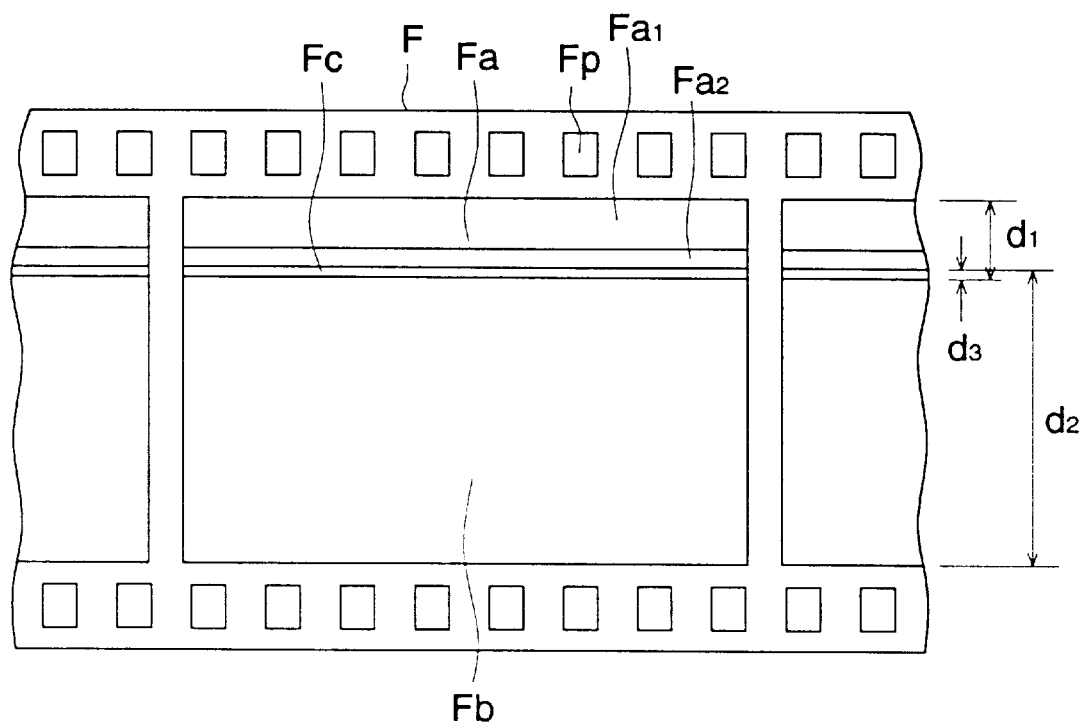
FIG. 15 is a diagram of a negative film.

First, forms of a negative film and a lens-fitted film unit used for the invention will be explained referring FIGS. 15 and 16. FIG. 15 is a diagram of the negative film, and FIG. 16 is a longitudinal section of the lens-fitted film unit.

In FIG. 15, negative film (hereinafter referred to as s film) F is exposed in advance to images of comic characters in a shape of a long belt intermittently, and latent images are formed. An area where these latent images are formed is called latent image section Fa.

A length of the latent image section Fa is set to be equal to or to be slightly shorter than a length of a longer side of exposed image plane Fb, and when film F is loaded in a lens-fitted film unit in a factory for production, perforation Fp is engaged with an unillustrated sprocket by the use of a mark which can be recognized visually, so that the latent image section Fa may agree positionally with an exposure aperture section through which the film is exposed to an object image to form an exposed image plane.

Figure 16:
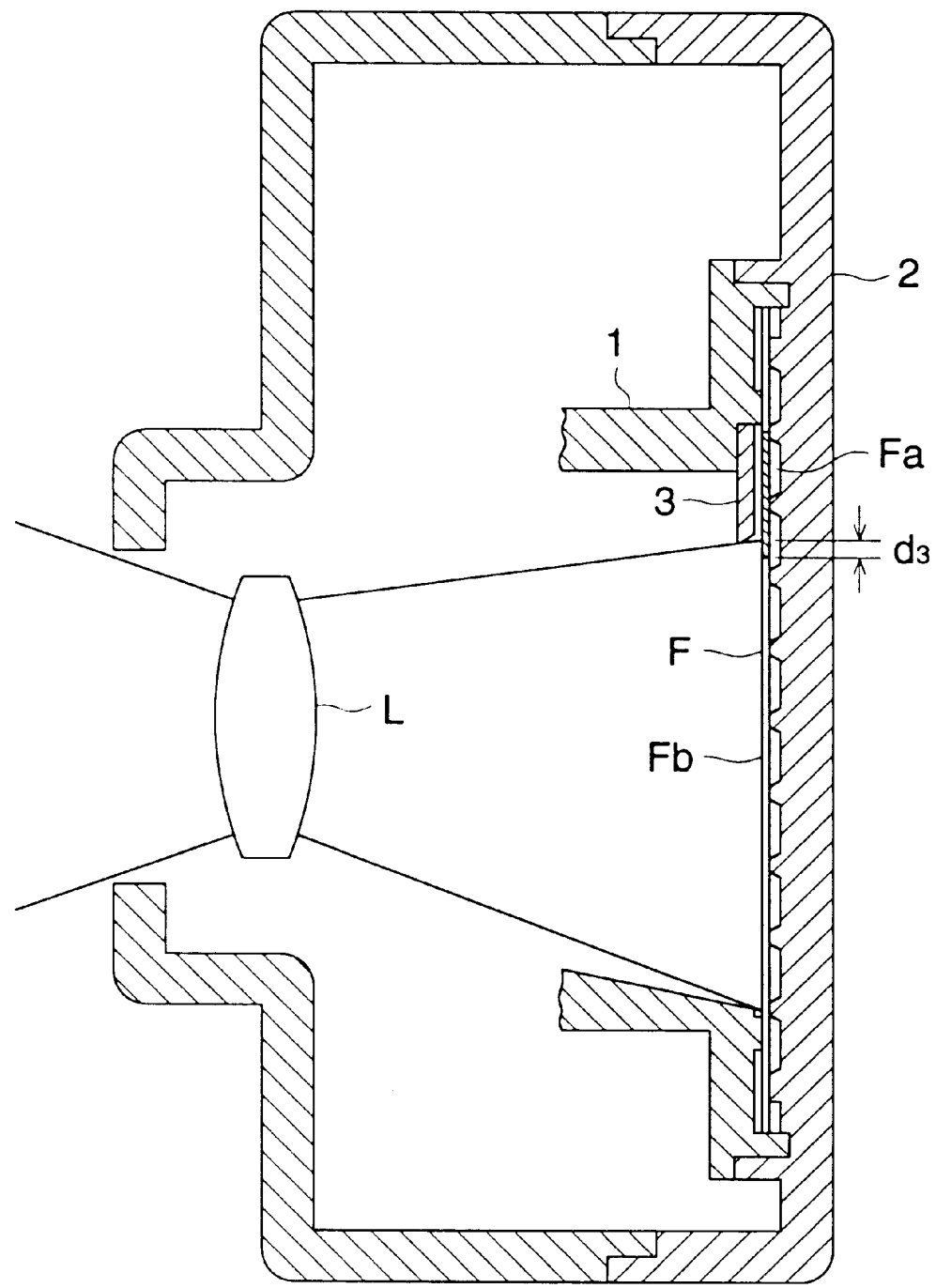
FIG. 16 is a longitudinal section of a lens-fitted film unit.

As shown in FIG. 16, when the film F is loaded in a lens-fitted film unit, the film F is held at the position of a focus of camera lens L by unit main body 1 and an inner surface of rear cover 2. When photographing is conducted, film F is exposed to light of an object through the camera lens L and exposed image plane Fb is formed, but the greater part of the latent image section Fa is shielded by masking plate 3 provided on unit main body 1, and it is not exposed to light.

However, film F is shifted in the vertical direction in FIG. 15 by a dimensional error of each part, and therefore, it is difficult to make an edge of latent image section Fa to agree with that of exposed image plane Fb. Therefore, the latent image section Fa and the exposed image plane Fb are caused on purpose to be subjected to double-exposure in a dimension of $d_3$, as shown in FIG. 16.

In FIG. 15, therefore, a width of the latent image section Fa is $d_1$, a shorter side of the exposed image plane Fb is $d_2$, and a width of double-exposure section Fc which is subjected to double-exposure is $d_3$.

In the present embodiment, the latent image section Fa is divided into two portions, and on e of them is image section $Fa_1$ which is positioned on the part of perforation Fp and is exposed to comic characters as latent images, and the other is boundary section $Fa_2$ which is positioned on the part of exposed image plane Fb and has density variation (gradation).

Figure 17:
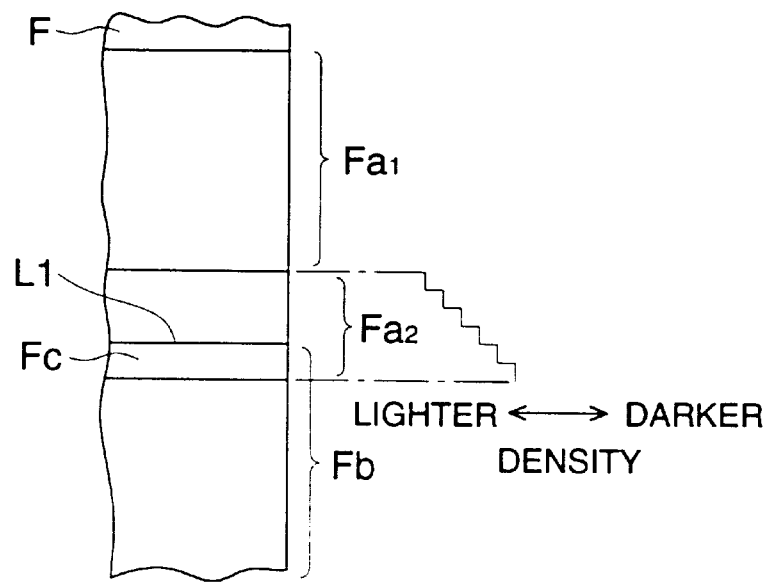
FIG. 17 is an enlarged view of a latent image section and others of a film.

As shown in an enlarged view in FIG. 17 as an example, negative density of the boundary section $Fa_2$ is formed to become higher gradually in the direction from the image section $Fa_1$ to the exposed image plane Fb. Therefore, negative density on double-exposure section Fc is considerably high, and an image of an object on the exposed image plane Fb in the double-exposure section Fc considerably disappears when a print is made. In addition, negative density on a certain point on the double-exposure section Fc becomes lower gradually as the point recedes in the distance from the exposed image plane Fb. Therefore, a boundary line of $L_1$ of the double-exposure section Fc becomes unclear. As a result, a width of a line of the double-exposure section Fc becomes unclear, and therefore, even when a line of he double-exposure section Fc is too thick, or even when the line width at right is different from that at left, or the line is tilted, no problem is cause on their appearance.

Figure 18:
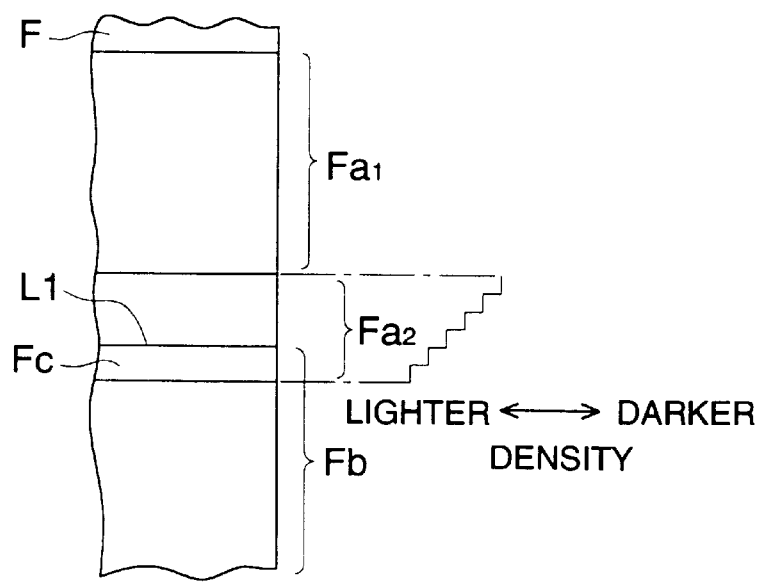
FIG. 18 is an enlarged view of a latent image section and others of a film.

In the enlarged view in FIG. 18, negative density of the boundary section $Fa_2$ is formed to become lower gradually in the direction from the image section $Fa_1$ side to the exposed image plane Fb. Accordingly, negative density on the double-exposure section Fc is considerably low, and when a print is made, the boundary line of $L_1$ of the double-exposure section Fc is unclear with an image of an object which disappears gradually because negative density becomes higher gradually towards image section $Fa_1$, although an image of an object in the exposed image plane Fb in the double-exposure section Fc appears clearly on the part of exposed image lane Fb. As a result, a line width of the double-exposure section Fc becomes unclear, and therefore, even when a line of he double-exposure section Fc is too thick, or even when the line width at right is different from that at left, or the line is tilted, no problem is cause on their appearance.

Figure 19:
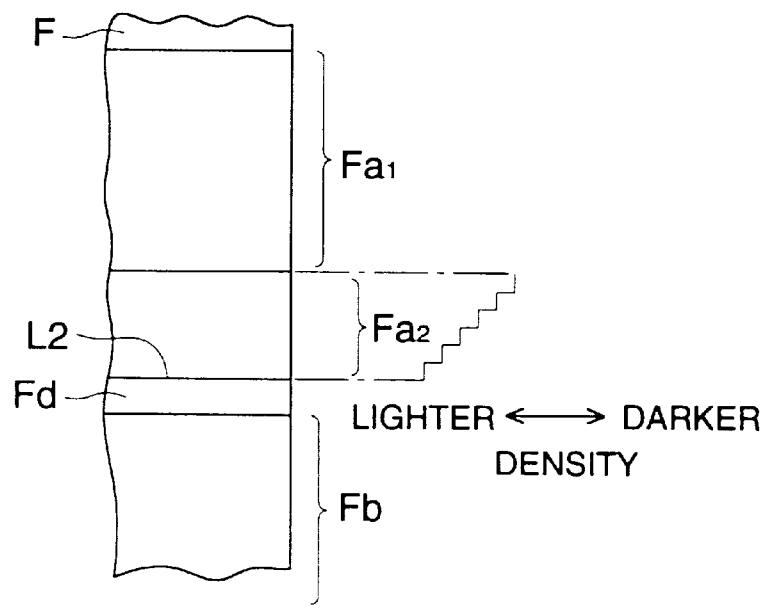
FIG. 19 is an enlarged view of a latent image section and others of a film.

It is further possible to extend masking plate 3 in FIG. 16 downward to shield the latent image section Fa surely. In the same way as in the foregoing, negative density of the boundary section $Fa_2$ is formed to gradually fall in the direction from the image section $Fa_1$ side to the exposed image plane Fb. As a result, as shown in the enlarged view in FIG. 19, unexposed clearance Fd is generated between the boundary section $Fa_2$ and the exposed image plane Fb. Though the unexposed clearance Fd becomes black on a print, it becomes dark color identical to clearance Fd because a portion on the boundary section $Fa_2$ closer to exposed image plane Fb is set to have low density, and it changes to brighter color gradually toward image section $Fa_1$. Therefore, boundary line L2 between clearance Fd and boundary section Fa becomes unclear. Namely, because of the line width of black clearance Fd which is unclear, even when a line of the boundary section $Fa_2$ is too thick, or even when the line width at right is different from that at left, or the line is tilted, no problem is cause on their appearance.

Incidentally, it is also possible to provide comic characters on the image section $Fa_1$, and to provide a background such as the sky on the boundary section $Fa_2$.

When a color of the latent image section is deviated in terms of color balance, such a single color of red only, or a single color of yellow only, it is preferable to form the total reflection factor of the latent image section Fa to be the neutral gray density of about 18%, independently of whether the boundary section $Fa_2$ like that stated above is provided or not, although there is a problem of color failure that a color of the exposed image plane is deviated from the actual color because of a complementary color which is added for only one color having a majority area on a print. Owing to the density on the latent image section Fa established to an average density, exposed image plane Fb is not affected by latent image section Fa in printing, and a print can be finished to be of a natural color without having a problem of doubling.

Figure 20:
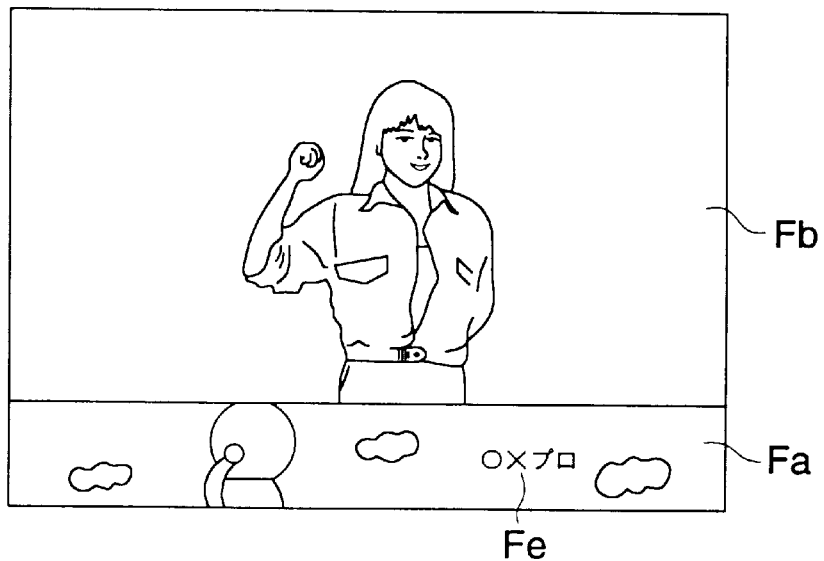
FIG. 20 is an example of a print made from a negative film.
Figure 21:
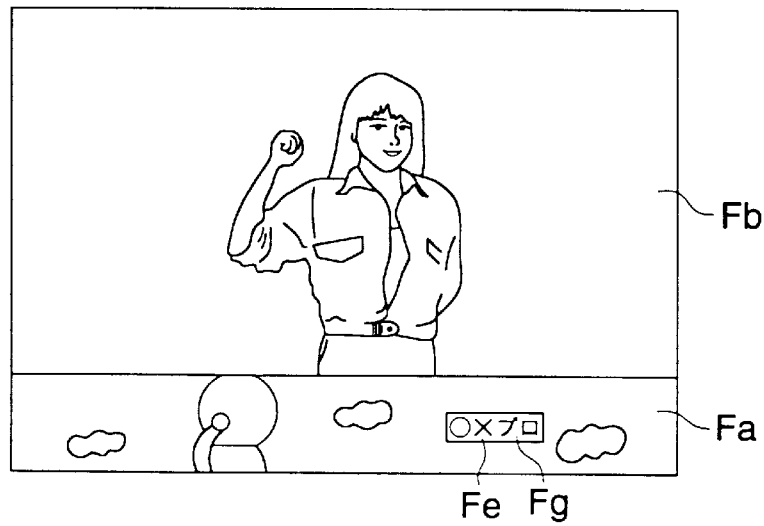
FIG. 21 is an example of a print made from a negative film.

Each of FIGS. 20 and 21 represents an example wherein the negative film was used to make a print. Though all prints represent naturally a visual image, the same names as in the foregoing will be used to make the explanation clear. Accordingly, the print is composed of exposed image plane Fb and latent image section Fa. Since there is cause a problem of copyright if comic characters are drawn on the latent image section Fa, it is necessary to describe letters of a production name and a publishing company for the comic. To make these letters to be easy-to-read ones without being light and hard-to-read, the latent image section Fa in FIG. 20 needs to be made to have negative density of at least either one of blue density of 2.5 or lower, green density of 2.1 or lower and red density of 1.7 or lower, and prescribed letters Fe having a color and density different from those of the latent image section Fa need to be formed on the latent image section Fa, which makes the letters to be extremely clear.

It is also possible to provide area Fg having a prescribed form in the latent image section Fa as shown in FIG. 21, and to make the density of the area Fg to be negative density of at least either one of blue density of 2.5 or lower, green density of 2.1 or lower and red density of 1.7 or lower, and to form prescribed letters Fe having a color and density different from those of the area Fg on the area Fg.

Incidentally, the negative density can be obtained by processing a film under ordinary processing conditions, and by measuring the image density.

Though the explanation has been given under the condition that the film in the embodiment is a 135 film, the film can also be IX 240 (APS) without being limited to the foregoing.

Figure 22:
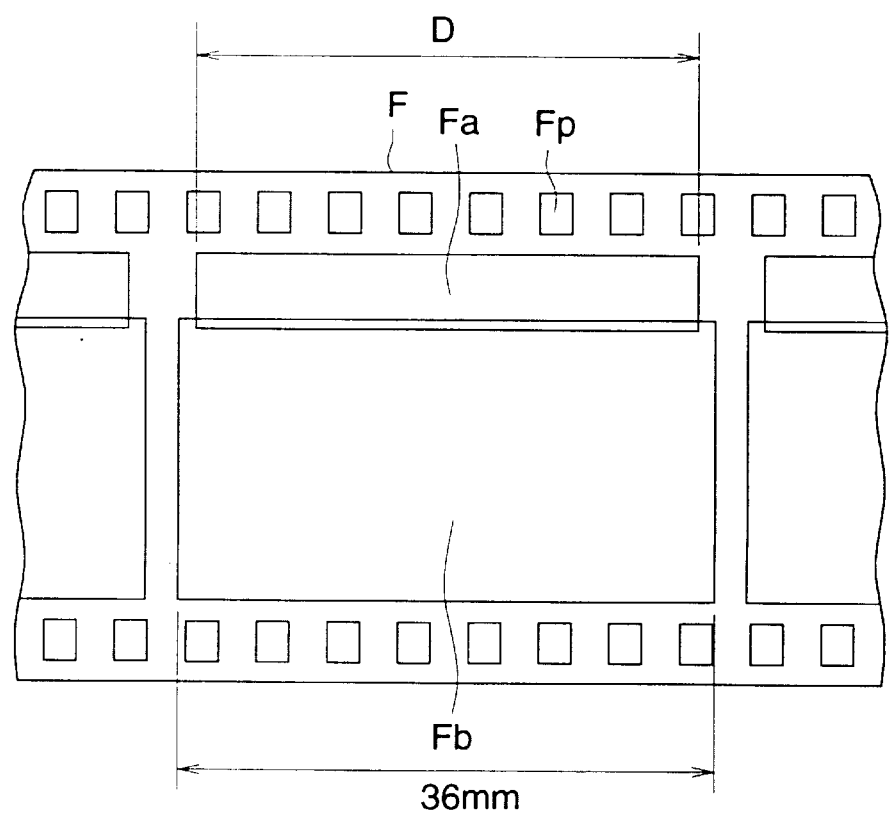
FIG. 22 is a diagram showing a length of the latent image section.

When a latent image section is formed to be a long and continuous belt shape as in the conventional film, there is caused a problem that frame detection is impossible on the printer, and automatic frame advancing is impossible. For example, when a 135 film is used, a length of the longer side of the exposed image plane Fb is 36 mm and an interval between image planes is 2 mm as shown in FIG. 22. To avoid the problem mentioned above, therefore, length D of the latent image section Fa needs to be 38 mm or less. It is preferable to make it to be 37.4 mm with a room. When it is made too short, however, there is a fear that the latent image section Fa is partially lost to be poor. On the other hand, when making a print from a negative film on the printer, all images on the exposed image plane Fb are not always printed, and images on the peripheral portions are not printed. Therefore, it is preferable to set the smallest value of length D of the latent image section to 32.4 mm, considering the area which is not printed by the printer.

Even in the case of the IX 240 film, it is preferable to set a length of the latent image section Fa to 31.4 mm–27.2 mm in the same concept as in the foregoing, because a length of the exposed image plane is 30.2 mm and an interval between image planes is 1.5 mm.

Incidentally, these dimensions are at the rate within a range of 90%–104% of the exposed image plane, for both 135 film and IX 240 films.

Further, in the lens-fitted film unit, when film winding is completed, a spool of a magazine tends to fall slightly, and thereby, a film in the course of photographing tends to be tilted slightly. As a result, as shown in the diagram of a film in FIG. 23, parallelism between exposed image plane Fb and latent image section Fa is lost. Therefore, the thickness of unexposed clearance Fd changes gradually, resulting in a poor boundary line.

It is preferable that an edge of the masking plate facing a side of the exposure frame is inclined to that side.

Figure 23:
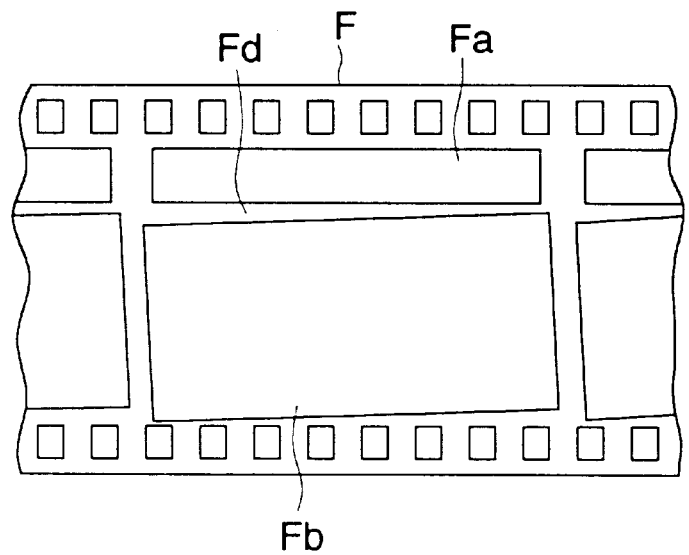
FIG. 23 is a diagram of a film wherein a width of a clearance of an unexposed section is changed.
Figure 24:
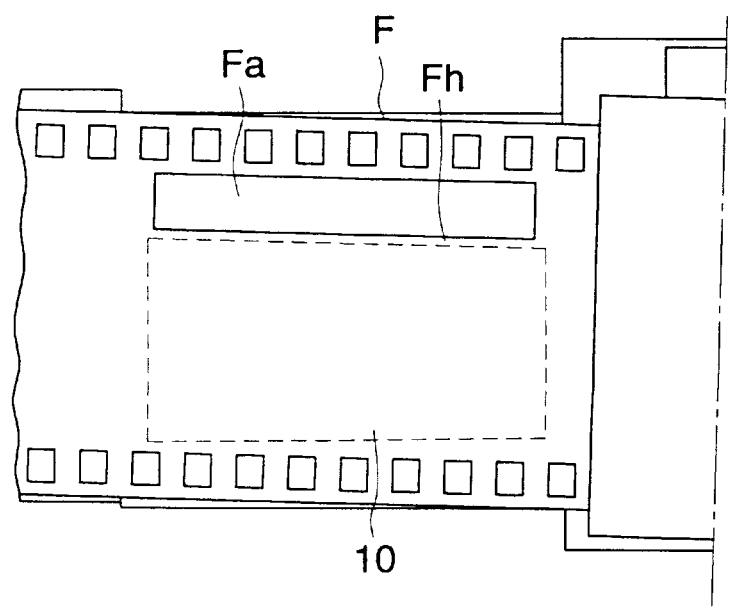
FIG. 24 is a diagram of the surroundings of an exposure aperture.

Therefore, if a side of the latent image section Fa at an exposure aperture section 10 through which the film is exposed to light to form an exposed image plane is tilted in accordance with an inclination of film F inclined in the film winding direction, as shown in the diagram of surroundings of the exposure aperture shown in FIG. 24, a thickness of unexposed clearance Fh is made to be constant. In FIGS. 23 and 24, this inclination is drawn to be greater, but an actual size is 0.4 mm which represents about 0.3 degrees as an angle for the longer side of 36 mm of exposed image plane Fb. It is also possible naturally to make them to be subjected to double exposure.

The negative film described in Structure (1) stated above and the lens-fitted film unit described in Structure (2) make it possible to realize a negative film and a lens-fitted film unit which are not poor, even when a boundary line between the exposed image plane and the latent image section is too thick, the line width at right is different from that at left, or the line is tilted.

The negative film described in Structure (3) and the lens-fitted film unit described in Structure (4) make it possible to realize a negative film and a lens-fitted film unit wherein a color failure caused by a latent image section is not caused on an exposed image plane.

The negative film described in Structures (5) and (7) and the lens-fitted film unit described in Structures (6) and (8) make it possible to realize a negative film and a lens-fitted film unit wherein letters can be clearly recognized visually even when letters are formed on a latent image section.

The negative film described in Structure (9) stated and the lens-fitted film unit described in Structure (10) make it possible to realize a negative film and a lens-fitted film unit which are free from that a latent image section makes frame-advancing impossible for the print, and a part of the latent image section is lost on the print.

The negative film described in Structure (11) makes it possible to realize a lens-fitted film unit wherein parallelism between an exposed image plane and a latent image section is not lost even when a film is tilted in the course of photographing by a spool of a magazine which falls when film winding is completed, and a thickness of a boundary line between the exposed image plane and the latent image section is constant.

An embodiment to attain the fourth object of the invention will be explained, referring to the drawings.

Figure 25:
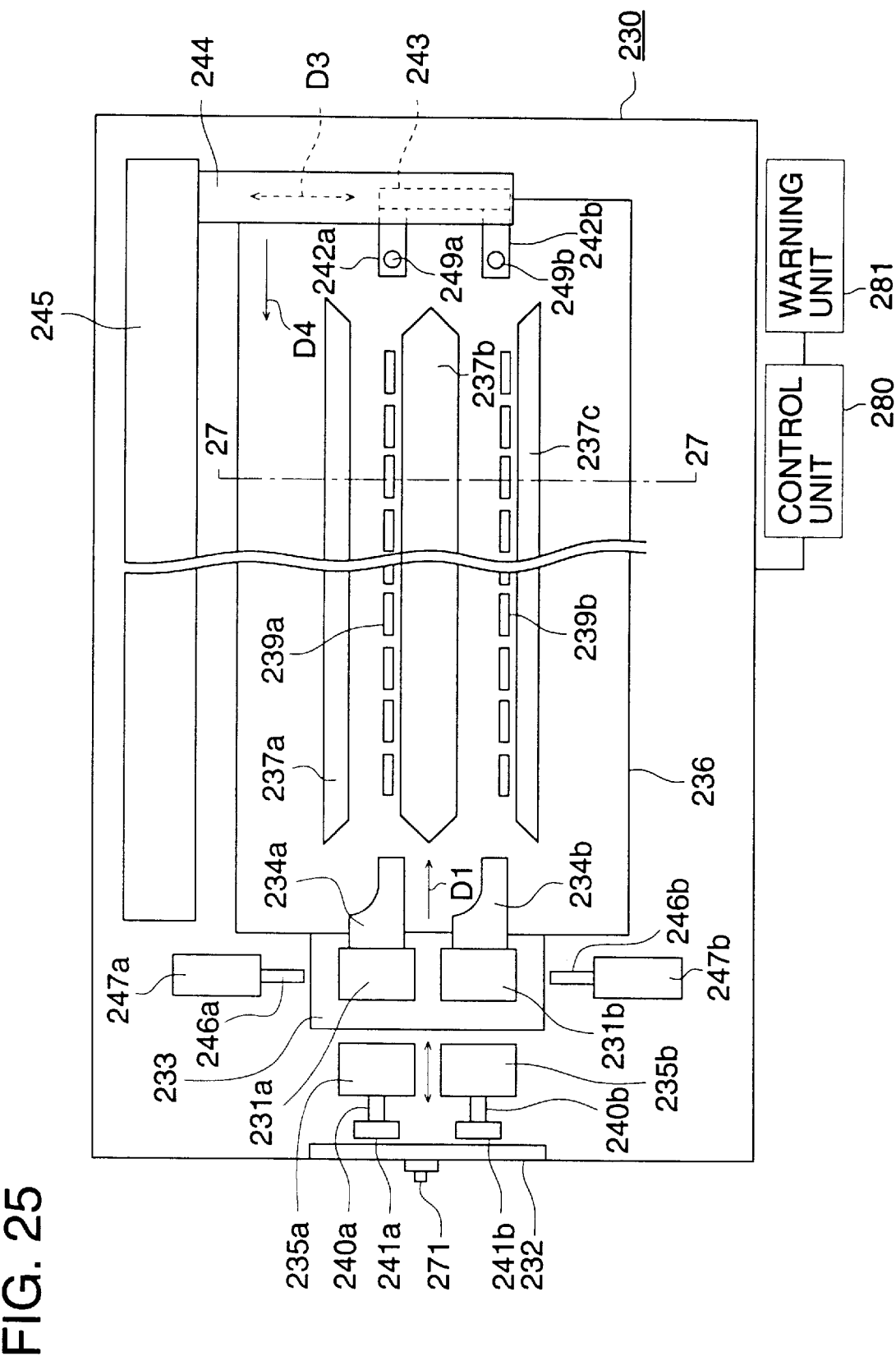
FIG. 25 is a top view showing the structure of an apparatus for manufacturing a film-loaded cartridge in the embodiment of the invention.
Figure 26:
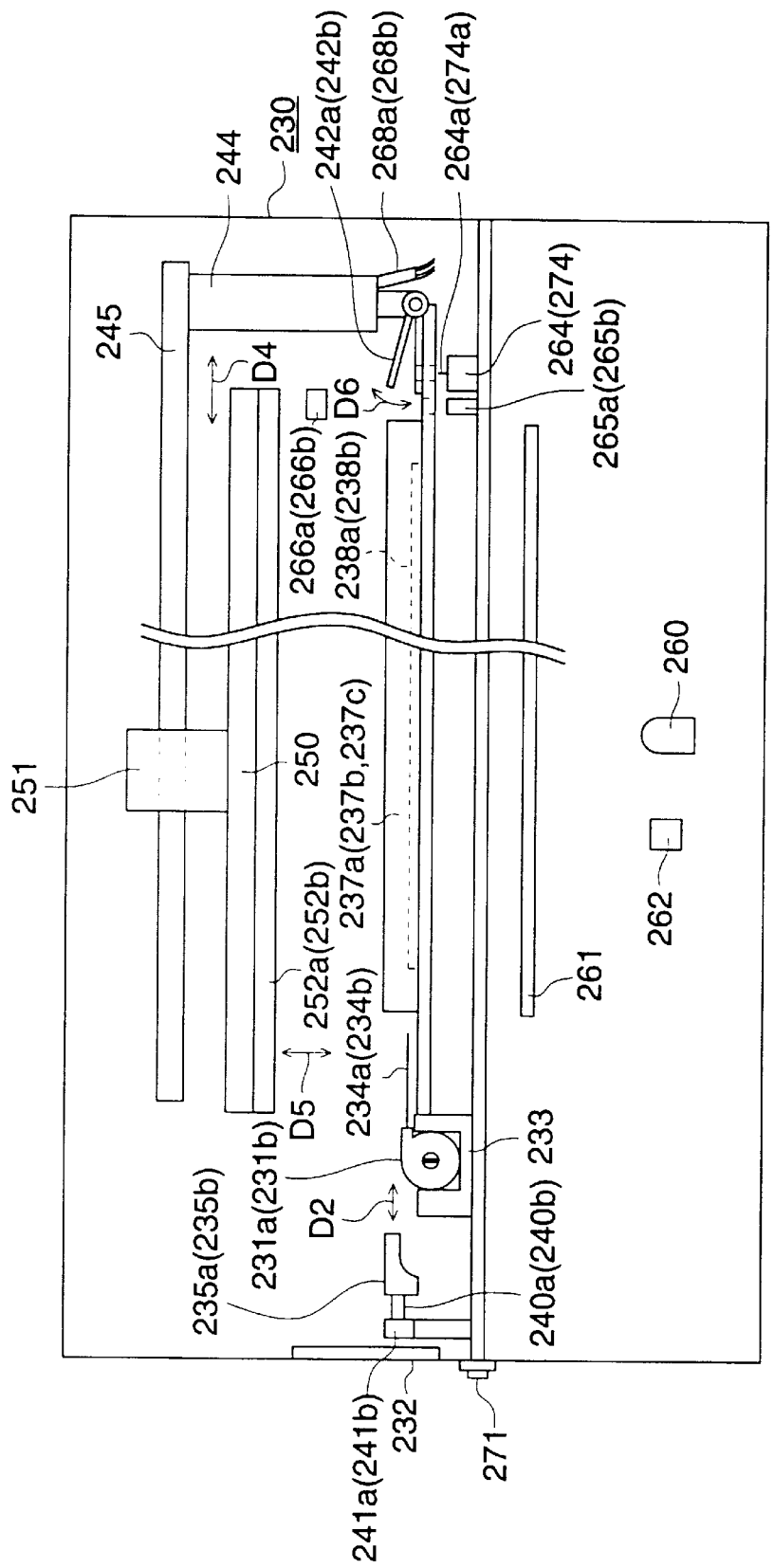
FIG. 26 is a side view showing the structure of an apparatus for manufacturing a film-loaded cartridge in the embodiment of the invention.
Figure 27:
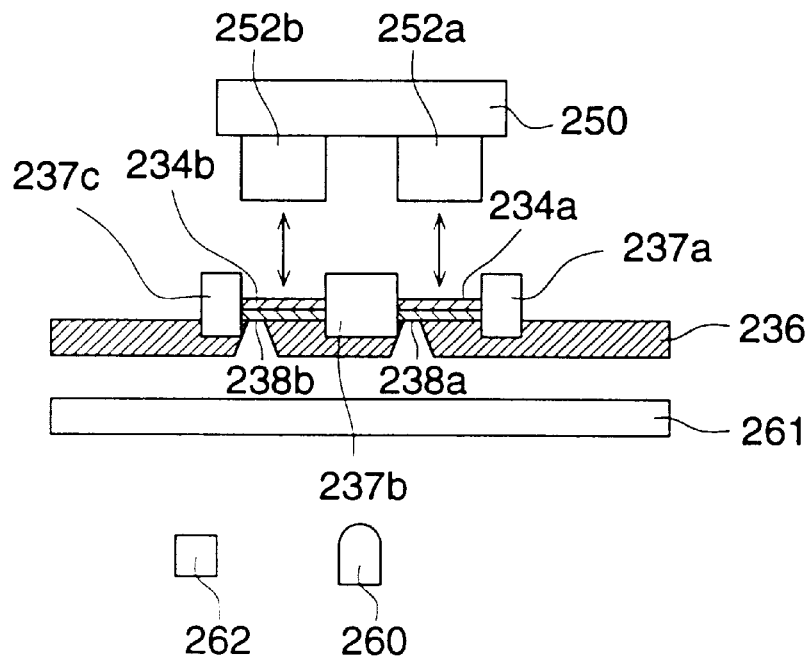
FIG. 27 is a sectional view taken on line 27—27 shown by FIG. 25 for an apparatus for manufacturing a film-loaded cartridge in the embodiment of the invention.

FIG. 25 is a top view showing the structure of a manufacturing method for a film-loaded cartridge in an embodiment of the invention, FIG. 26 is a side view showing the structure of a film-loaded cartridge manufacturing equipment in an embodiment of the invention, and FIG. 27 is a sectional view taken on line 27—27 shown in FIG. 25 in the film-loaded cartridge manufacturing equipment in an embodiment of the invention.

In FIGS. 25, 26 and 27, film-loaded cartridge manufacturing equipment 230 is equipped with cartridge gateway 232 for taking plural (two, in this case) film-loaded cartridges 231a and 231b in an out, cartridge holder 233 for holding film-loaded cartridges 231a and 231b, cartridge supporters 235a and 235b for fixing film-loaded cartridges 231a and 231b held by the cartridge holder 233 when taking out films 234a and 234b in the film-loaded cartridges 231a and 231b, driving motors 241a and 241b for driving cylinders 240a and 240b which move cartridge supporters 235a and 235b in the supporting direction D2, film take-up shafts 246a and 246b which are attached on spools of the film-loaded cartridges 231a and 231b when rewinding the films 234a and 234b, and film-winding motors 247a and 247b for driving the film take-up shafts 246a and 246b to rotate.

The film-loaded cartridge manufacturing equipment 230 is provided with stage 236 on which films 234a and 234b are placed after being drawn out for forming a latent image, guides 237a, 237b and 237c which are provided on the stage 236 to draw out films 234a and 234b in drawing-out direction (film-longitudinal direction) D1, original image sheets 238a and 238b which are held between the guides 237a, 237b and 237c on the stage 236 by an unillustrated holding member and on which original images showing various characters are recorded, exposure windows 239a and 239b for forming original images of the original image sheets 238a and 238b as latent images on a part of a portion corresponding to frames for photographing on films 234a and 234b, electronic flash unit 260 which emits electronic flash light, diffusion plate 261 for equalizing, through the exposure windows 239a and 239b, an amount of irradiation of electronic flash light emitted from the electronic flash unit 260 for all original images of the original image sheets 238a and 238b, photo-sensor 262 for detecting whether the electronic flash unit 260 has emitted electronic flash light or not, and punching units 264 and 274 having respectively punch sections 264a and 274a for punching holes, for example, on the films 234a and 234b for the marking which shows that latent images have been formed on the films 234a and 234b.

Further, the film-loaded cartridge manufacturing equipment 230 is provided with film dampers 242a and 242b each of which moves an arm on one side in the pinching direction, and holds a tip section of each of films 234a and 234b extruded from film-loaded cartridges 231a and 231b by nipping it, to pull out in the drawing-out direction while keeping a prescribed distance from each of original image sheets 238a and 238b, brushes 268a and 268b for removing dust on the original image sheets while the films 234a and 234b are being drawn out, slider 243 which holds the film dampers 242a and 242b as well as the brushes 268a and 268b, then slides them in the slide direction D3 to draw out the film clampers 242a and 242b, and makes them to retreat from the path, slider 244 which holds the slider 243 slidably, and pulls films 234a and 234b out of the film-loaded cartridges 231a and 231b, or returns the film dampers 242a and 242b to their initial positions for film drawing-out, holding section 245 which holds the slider 244 slidably, film pressing member 250 which presses the films 234a and 234b drawn out by the film clampers 242a and 242b, and moving mechanism 251 which moves the film pressing member 250 in the vertical direction D5. Incidentally, there are provided sponges 252a and 252b on the surface of the film pressing member 250 which touches the films 234a and 234b, so that the surfaces of the films 234a and 234b may not be scratched.

The film clampers 242a and 242b respectively have on their tip portions hole sections 249a and 249b, and punch sections 264a and 264b of the punching units 264 and 274 respectively pass through films 234a and 234b and reach hole sections 249a and 249b. Since sponges and cloth are provided on the surfaces nipping respectively films 234a and 234b of the tip sections of the film dampers 242a and 242b, no scratches are caused on the surfaces of the films 234a and 234b, and an arrangement is made so that sliding may be caused against films 234a and 234b, and a play of several millimeters may be generated on the film-loaded cartridges 231a and 231b, when drawing-out of the films 234a and 234b is completed. Due to this, uniform tension is given to the films 234a and 234b.

In addition, the film-loaded cartridge manufacturing equipment 230 is equipped with light sources 265a and 265b which emit infrared light for confirming whether films 234a and 234b have been drawn out completely or not and with photo-sensors 266a and 266b which receive infrared light from the light sources 265a and 265b.

Further, the film-loaded cartridge manufacturing equipment is equipped with control unit 280 which controls overall equipment and with warning unit 281 which gives various warnings to an operator through a voice or a message.

Next, a manufacturing method employing the film-loaded cartridge manufacturing equipment in the embodiment attaining the fourth object of the invention will be explained.

First, an operator opens cartridge gateway door 232, and sets two film-loaded cartridges 231a and 231b in which no latent images are formed in cartridge holder 233. Next, the operator presses automatic operation button 271 to start operations of film-loaded cartridge manufacturing equipment 230.

Figure 28:
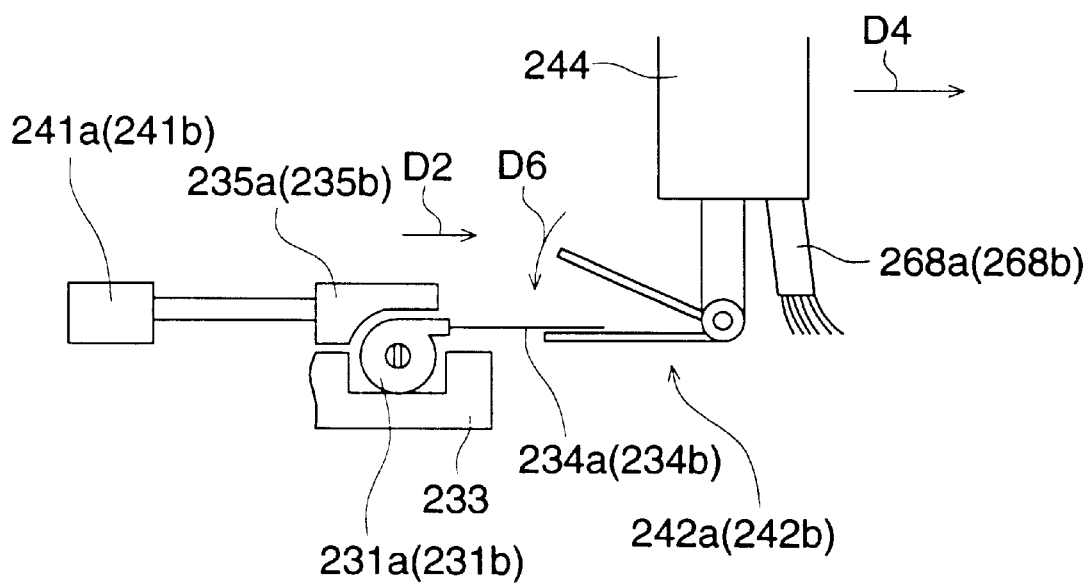
FIG. 28 is a diagram to illustrate drawing-out of a film in an apparatus for manufacturing a film-loaded cartridge in the embodiment of the invention.

On the control unit 280 of the film-loaded cartridge manufacturing equipment 230, when it is detected that the automatic operation button 271 was pressed, the cartridge gateway door 232 is closed to be in the state of a dark room. After that, as shown in FIG. 28, driving motors 241a and 241b drive respectively cylinders 240a and 240b to move cartridge supporters 235a and 234b in the supporting direction D2. Due to this, film-loaded cartridges 231a and 231b are fixed in the cartridge holder 233.

Next, as shown in FIG. 28, tip portions of films 234a and 234b which are protruded from the film-loaded cartridges 231a and 231b are held the film clampers 242a and 242b which are positioned at initial positions for drawing-out of films 234a and 234b. After nipping the films 234a and 234b, the slider 244 is slid in the slide direction D4, and thereby the films 234a and 234b are drawn out while they are being lifted. Incidentally, simultaneously with drawing-out of the films 234a and 234b, dust on original image sheets 238a and 238b are removed by brushes 268a and 268b.

At this point, it is judged whether the films 234a and 234b have completely been drawn out of film-loaded cartridges 231a and 231b or not. To be concrete, infrared light emitted from the light sources 265a and 265b are detected by photo-sensors 266a and 266b, and judgment is made based on the results of that detection. When the films 234a and 234b are judged to have been drawn out completely, film pressing member 250 is moved in the downward direction D5 by moving mechanism 251, and the film pressing member 250 is pressed on the films 234a and 234b thus pulled out, and thereby the films 234a and 234b are brought into close contact with original image sheets 238a and 238b through sponges 252a and 252b.

On the other hand, When the films 234a and 234b are judged not to have been drawn out, warning unit 281 warns an operator that the films have not been drawn out by means of a voice or a message display.

Then, after emission of electronic flash is conducted by electronic flash unit 260 and an amount of light arriving at exposure windows 239a and 239b is equalized by diffusion plate 261, original images on original image sheets 238a and 238b are formed as a latent image on the films 234a and 234b through light passed through the exposure windows 239a and 239b.

Next, the film pressing member 250 is moved by the moving mechanism in the upward direction D5 to release the close contact with films 234a and 234b. This makes film rewinding possible.

Figure 29:
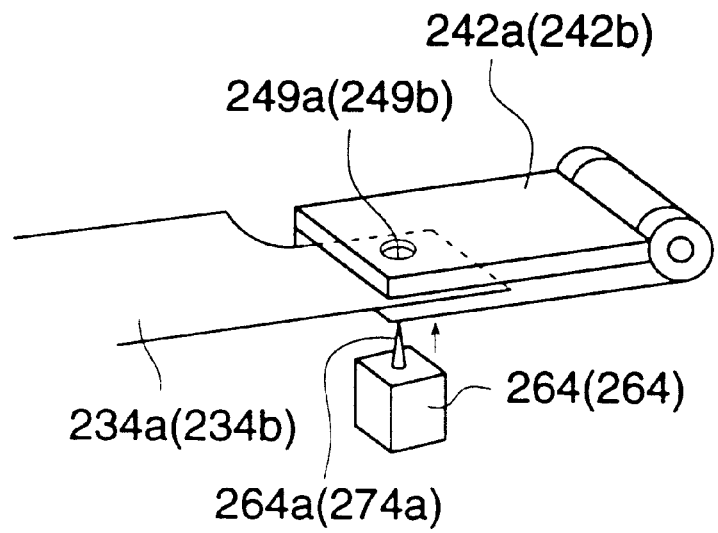
FIG. 29 is a diagram to illustrate marking showing that a latent image is formed on a film in an apparatus for manufacturing a film-loaded cartridge in the embodiment of the invention.

Further, as shown in FIG. 29, holes are made on films 234a and 234b by punch sections 264a and 264b of the punching units 264 and 274 to conduct marking showing that latent images are formed.

Incidentally, whether emission of electronic flash by electronic flash unit 260 has been conducted or not is judged based on the results of detection made by photo-sensor 262, and when the emission of electronic flash is not conducted, the punching units 264 and 274 are made not to make holes on the films 234a and 234b, because no latent images are formed on the films 234a and 234b. Further, warning unit 281 warns an operator, by means of a voice or a message display, that no latent images are formed.

Owing to this, an operator can easily capture whether latent images have been formed on a film in a film-loaded cartridge or not, thus, it can be prevented that forming of latent images is conducted again on the film-loaded cartridge on which latent images have already been formed.

After conducting marking which shows that latent images have been formed, arms of film clampers 242a and 242b move to make films 234a and 234b to be in the open state.

Further, slider 243 is slid in the slide direction D3 to draw out film dampers 242a and 242b to cause them to retreat from the path. The reason for this is to make an arrangement so that rewinding of films 234a and 234b and returning of film clampers 242a and 242b to its initial position for film drawing-out may be conducted simultaneously.

Next, film take-up shafts 246a and 246b are mounted on spools of film-loaded cartridges 231a and 231b, and film-winding motors 247a and 247b are driven. Due to this, the film take-up shafts 246a and 246b are rotated and films 234a and 234b are rewound to be in the state identical to that wherein the tip portion of the film is protruded slightly and latent images are not yet formed.

Then, each of film clampers 242a and 242b is returned to its initial positions on the path for film drawing-out by sliding slider 244 to the cartridge holder 233 side in the slide direction D4 and by sliding slider 243 in the slide direction D3. Due to this, the film clampers 242a and 242b are made to be capable of nipping a film in a film-loaded cartridge to be set in the cartridge holder 233 in the next place.

After the films 234a and 234b are rewound respectively into the film-loaded cartridges 231a and 231b, film take-up shafts 246a and 246b are removed from spools of the film-loaded cartridges 231a and 231b. Further, film supporters 235a and 235b moves in the supporting direction D2 to release fixing of the film-loaded cartridges 231a and 231b.

Lastly, cartridge gateway door 232 is opened. Due to this, an operator can take the film-loaded cartridges 231a and 231b out of the cartridge holder 233. In this case, an operator can confirm that the film is one on which latent images are formed, because a marking showing that latent images are formed is provided on the tip portion of each of films 234a and 234b protruded slightly respectively from the film-loaded cartridges 231a and 231b.

Incidentally, in the embodiment of the invention, there has been explained about the occasion wherein latent images are formed on two films loaded respectively in two film-loaded cartridges. However, forming of latent images of the invention can also be conducted for one or not less than 3 films in film-loaded cartridges.

Next, there will be explained about the structure of a lens-fitted film unit which is loaded with a film-loaded cartridge (patrone) having therein formed latent images, and a manufacturing method for the same.

Figure 30:
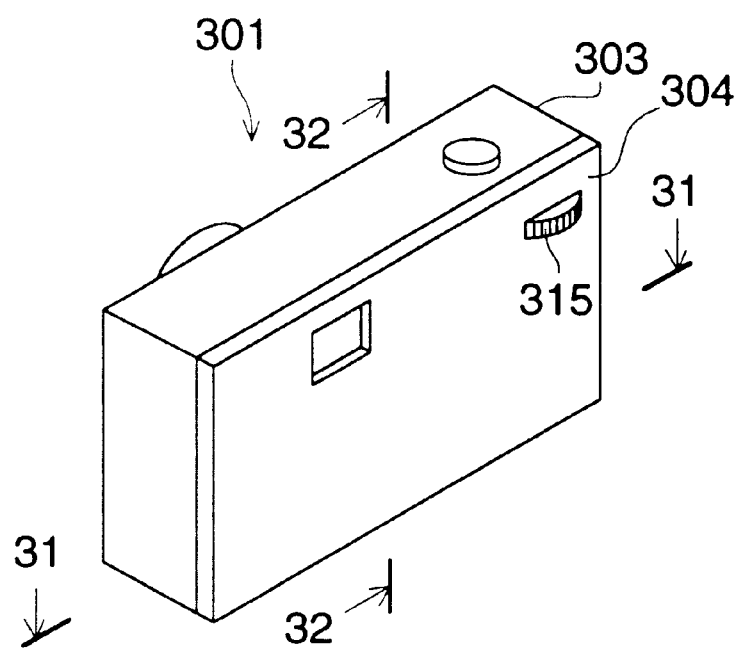
FIG. 30 is a diagram showing the outer structure of a lens-fitted film unit in the embodiment of the invention.
Figure 31:
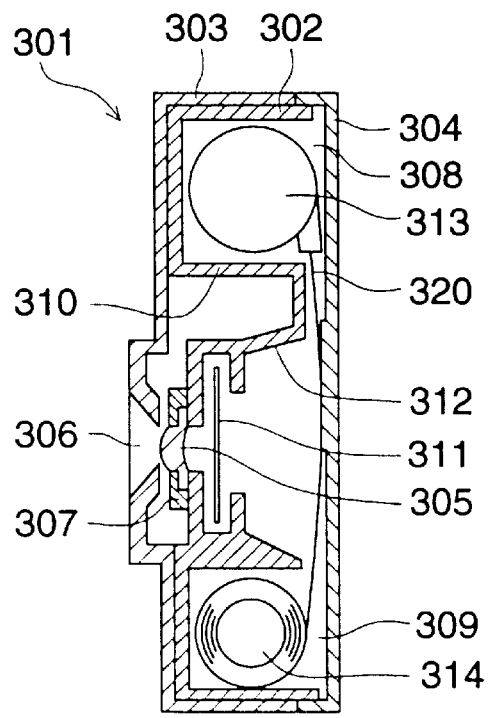
FIG. 31 is a sectional view taken on line 31—31 of a lens-fitted film unit shown in FIG. 30.
Figure 32:
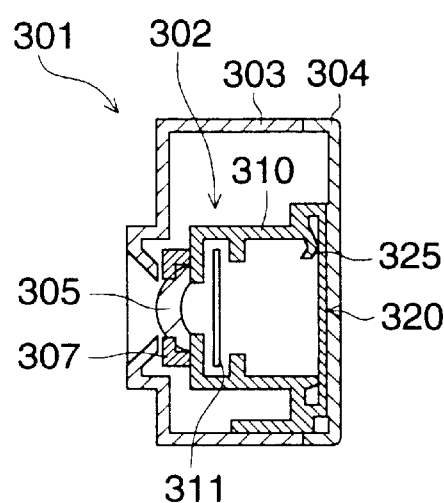
FIG. 32 is a sectional view taken on line 312—312 of a lens-fitted film unit shown in FIG. 30.

FIG. 30 is a diagram showing the external structure of a lens-fitted film unit in the embodiment of the invention, and FIG. 31 and FIG. 32 represent sectional views which are respectively taken on lines 31—31 and 32—32 in the lens-fitted film unit shown in FIG. 30. Lens-fitted film unit 301 is provided with unit main body 302, front cover 303 and rear cover 304, and the unit main body 302 is entirely covered by the front cover 303 and the rear cover 304.

On the front cover 303, there is provide photographing window 306 to be close to camera lens 305. On the rear cover 304, there is protruded film winding knob 315 which is mounted on the unit main body 302.

At the central portion of frame 310 of the unit main body 302, there is mounted camera lens 305 which is held by lens holder 307. Behind (on the side opposite to an object) the camera lens 305, there is arranged shutter 311, and photographing frame 312 is provided behind the shutter 311.

The photographing frame 312 is provided for the purpose of conducting exposure to film 320 through the camera lens 305, and patrone chamber 308 and film roll chamber 309 are provided on both sides of the photographing frame 312 to sandwich it. In the patrone chamber 308, there is loaded patrone 313, and in the film roll chamber 309, there is loaded film roll 314.

Film 320 is wound with its one end fixed on patrone 313, and the film 320 is drawn out of the patrone 313 to become film roll 314. Though an unexposed film is loaded in the film roll chamber 309 in the form of film roll 314 when a lens-fitted film unit is shipped, the film exposed after photographing is wound, through film winding by film-winding knob 315, into the patrone 313 to be loaded in the patrone chamber 308 in succession.

Figure 33:
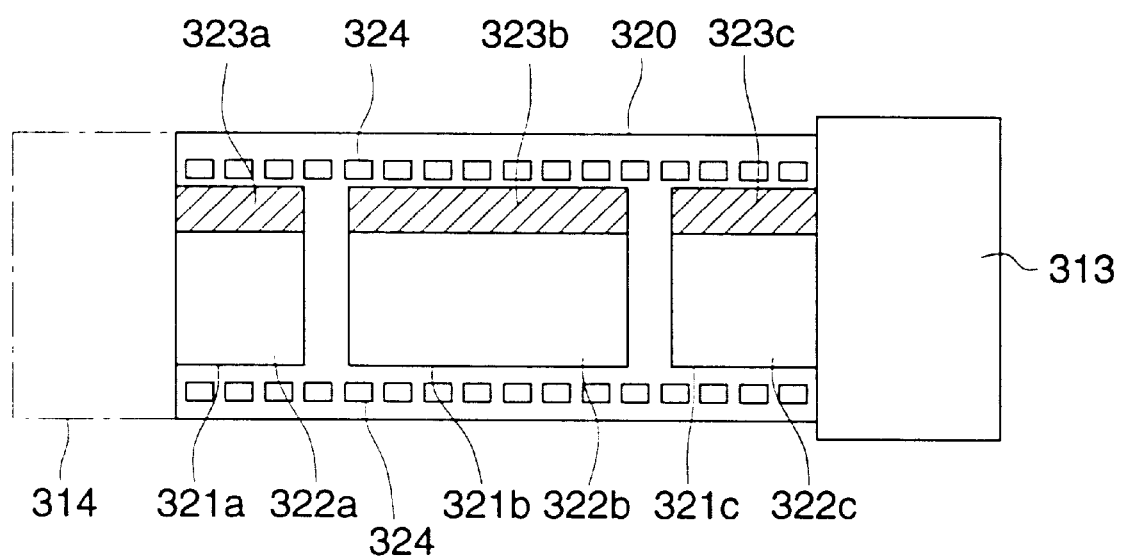
FIG. 33 is a diagram showing the structure of a film in the embodiment of the invention.

FIG. 33 is a diagram showing the structure of a film in the embodiment of the invention. In FIG. 33, there are formed, in the longitudinal direction of film 320, perforations 324 each being in a form of a rectangular hole for transmitting film winding force. Further, on photographing frames 321a, 321b and 321c of the film 320, there are provided respectively unexposed sections 322a, 322b and 322c and exposed sections 323a, 323b and 323c. The exposed sections 323a, 323b and 323c are the portions where latent images are formed by the film-loaded cartridge manufacturing equipment 230 stated above, and each of them is formed, in a belt shape, on the upper edge portion, for example, of each of photographing frames 321a, 321b and 321c.

Incidentally, masking mask 325 is provided on photographing frame 312 for the purpose of preventing double-exposure to exposed sections 323a, 323b and 323c in the course of photographing. The masking mask 325 is formed to be solid with photographing frame 312, and it covers the front side (closer to an object) of each of the exposed sections 323a, 323b and 323c so that each of exposed sections 323a, 323b and 323c may not be exposed.

A manufacturing method for the lens-fitted film unit having the structure stated above will be explained next.

After the film-loaded cartridge which is formed with latent images by the method mentioned above is obtained, it is loaded in a lens-fitted film unit in the following manner.

First, one end of latent-image-formed film 320 in patrone (film-loaded cartridge) 318 is fixed on an unillustrated film take-up shaft. After that, the film take-up shaft is rotated to draw the film 320 out of the patrone 313 and thereby to form film roll 314 on the film-take-up shaft. Then, the film roll 314 thus formed and patrone 313 are loaded respectively in film roll chamber 309 and patrone chamber 308 of unit main body 302. Lastly, the rear cover 304 is attached on the unit main body 302 to cover the film roll 314 and patrone 313 both loaded in the unit main body 302. This concludes manufacture of a lens-fitted film unit.

Incidentally, it is also possible to load a film take-up shaft and patrone 313 in unit main body 302 after fixing one end of film 320 to the film take-up shaft, then, mount rear cover 304 on the unit main body 302, and to draw the film 320 out of the patrone 313 by rotating the film take-up shaft to form film roll 314 on the film take-up shaft.

Or, it is also possible to load a film take-up shaft and patrone 313 in unit main body 302 after fixing one end of film 320 to the film take-up shaft, then draw the film 320 out of the patrone 313 by rotating the film take-up shaft to form film roll 314 on the film take-up shaft, and to mount the rear cover 304 on the unit main body 302 to cover the formed film roll 314 and patrone 313.

The present invention makes it possible to form latent images on a film at need before a film-loaded cartridge is loaded in a lens-fitted film unit manufacturing equipment. It is therefore possible to make a manufacturing equipment to be small and to utilize an existing manufacturing equipment in manufacture of lens-fitted film units. It is further possible to easily provide a film-loaded cartridge wherein various original images are formed as latent images, and manufacture of diverse products in a small quantity is possible. Furthermore, it is possible to control lots easily, because latent images are formed in a film-loaded cartridge.

Disclosed embodiment can be varied by a skilled person without departing from the spirit and scope of the invention.

What is claimed is:

1. A lens-fitted film unit comprising:
   (a) a main body;
   (b) a photographic lens provided in the main body, having an aperture value;
   (c) an aperture provided in the main body;
   (d) a shutter provided in the main body;
   (e) a photographic film loaded in the main body, having image frames each including an unexposed portion and a pre-exposed portion on which a latent image has been formed; and
   (f) a masking member for masking the pre-exposed portion of the photographic film when a photographing operation is conducted,
   wherein the latent image has been formed on the photographic film with a same exposure amount as that obtained when an object to be photographed having a brightness of not less than 10 and not more than 12.5 in terms of light values in which a photographic film whose ISO sensitivity is 100, is exposed to light with an aperture value of the photographic lens set by the aperture and with the shutter speed of the shutter.

2. The lens-fitted film unit of claim 1, wherein the light value is not less than 11 and not more than 12.

3. The lens-fitted film unit of claim 1, wherein the masking member does not mask a part of the pre-exposed portion when photographed.

4. The lens-fitted film unit of claim 3, wherein the pre-exposed portion has a large quantity of exposure portion provided on the unexposed portion side and an image portion in which the image is exposed, and the masking member does not mask a part of the large quantity of exposure portion when photographed.

5. The lens-fitted film unit of claim 4, wherein a distance between a border of the unexposed portion and of the large quantity of exposure portion and a leading edge of the masking member when the photographic film is shifted toward the masking member in a film conveyance path with respect to a width direction of the photographic film, is not less than 0.1 mm and not more than 0.3 mm, and
   wherein a width in the width direction of the large quantity of exposure portion is not less than 0.5 mm and not more than 0.8 mm.

6. The lens-fitted film unit of claim 1, wherein the pre-exposed portion includes a border portion on the unexposed portion side in which density of a negative film is gradually changed.

7. The lens-fitted film unit of claim 1, wherein the pre-exposed portion is formed with density of a neutral gray color whose reflectance is about 18% as a whole.

8. The lens-fitted film unit of claim 1, wherein the pre-exposed portion includes at least one of an area of negative density in which blue density is not more than 2.5, green density is not more than 2.1, and red density is not more than 1.7, and a prescribed character is formed on the area as the latent image.

9. The lens-fitted film unit of claim 1, wherein the pre-exposed portion includes a plurality of pre-exposed subportions spaced away from each other in a longitudinal direction of the film.

10. The lens-fitted film unit of claim 9, wherein a length of each of the pre-exposed subportions in the longitudinal direction of the film is not less than 90% and not more than 104% of a length of each of the image frames in the longitudinal direction.

11. The lens-fitted film unit of claim 1 further comprising an exposure opening portion through which an object image is exposed to the photographic film to form a photographed image plane when photographing, and at least one side of the exposure opening portion is provided with inclination.

12. The lens-fitted film unit of claim 11, wherein at least one side of the exposure opening portion is inclined in accordance with an inclination of the photographic film.

13. The lens-fitted film unit of claim 1, wherein the photographic film includes a mark representing that the latent image has been formed on the pre-exposed portion.

* * * * *

UNITED STATES PATENT AND TRADEMARK OFFICE
CERTIFICATE OF CORRECTION

PATENT NO. : 6,341,200 B1
DATED : January 22, 2002
INVENTOR(S) : Nakanishi et al.

It is certified that error appears in the above-identified patent and that said Letters Patent is hereby corrected as shown below:

Drawings,
FIG. 29, after "264" delete "(264)" and insert therefor -- (274) --.

Column 2,
Line 56, delete "his" and insert therefor -- this --.

Column 3,
Line 8, after "the" delete "object" and insert therefor -- three objects --.
Line 11, after "cause" delete "a" and insert therefor -- an --.
Lines 25, 40 and 55, after "the" (first occurrence) delete "third object" and insert therefor -- three objects --.
Line 63, after "not" delete "in".
Line 63, after "parallel" insert therefor -- to --.

Column 4,
Line 1, after "the" (first occurrence) delete "third object" and insert therefor -- three objects --.

Column 5,
Line 7, after "covers" delete "an" and insert therefor -- a --.

Column 6,
Line 28, after "of" (second occurrence) delete "an" and insert therefor -- a --.

Column 7,
Line 67, after "means" delete "wherein the pinching means".

Column 9,
Line 38, after "line" delete "78-8" and insert therefor -- 8-8 --.

Column 10,
Line 25, after "line" delete "312-312" and insert therefor -- 32-32 --.

Column 13,
Line 56, after "to" delete "while" and insert therefor -- white --.

Column 15,
Line 52, after "and" delete "on e" and insert therefor -- one --.

UNITED STATES PATENT AND TRADEMARK OFFICE
CERTIFICATE OF CORRECTION

PATENT NO. : 6,341,200 B1
DATED : January 22, 2002
INVENTOR(S) : Nakanishi et al.

It is certified that error appears in the above-identified patent and that said Letters Patent is hereby corrected as shown below:

Column 16,
Lines 5 and 21, after "of" delete "he" and insert therefor -- the --.
Line 7, after "is" (first occurrence) delete "cause" and insert therefor -- caused --.
Lines 23 and 43, after "is" (second occurrence) delete "cause" and insert therefor -- caused --.
Line 26, after "Fa" delete "surely" and insert therefor -- securely --.
Line 67, after "is" delete "cause".

Column 19,
Lines 22, 35 and 52, after "film" delete "dampers" and insert therefor -- clampers --.
Line 30, before "242a" delete "dampers" and insert therefor -- clampers --.

Column 20,
Line 19, after "and" delete "234b" and insert therefor -- 235b --.

Column 21,
Line 15, after "film" delete "dampers" and insert therefor -- clampers --.
Line 38, after "235b" delete "moves" and insert therefor -- move --.
Line 66, after "is" delete "provide" and insert therefor -- provided --.

Signed and Sealed this

Twenty-fifth Day of October, 2005

JON W. DUDAS
*Director of the United States Patent and Trademark Office*